United States Patent [19]

Berner et al.

[11] Patent Number: 5,274,016

[45] Date of Patent: * Dec. 28, 1993

[54] LIGHT-STABILIZED POLYMER MICROPARTICLES

[75] Inventors: Godwin Berner, Binningen; Manfred Rembold, Aesch; Jean Rody, Riehen; Mario Slongo, Tafers, all of Switzerland

[73] Assignee: Ciba-Geigy Corporation, Ardsley, N.Y.

[*] Notice: The portion of the term of this patent subsequent to Jan. 16, 2007 has been disclaimed.

[21] Appl. No.: 741,238

[22] Filed: Aug. 5, 1991

Related U.S. Application Data

[63] Continuation of Ser. No. 611,399, Nov. 7, 1990, abandoned, which is a continuation of Ser. No. 937,594, Dec. 3, 1986, abandoned.

[30] Foreign Application Priority Data

Dec. 6, 1985 [CH] Switzerland .......................... 5227/85

[51] Int. Cl.$^5$ .......................... C08K 5/34; C08K 7/16; C08F 2/00
[52] U.S. Cl. ........................ 524/100; 524/94; 524/109; 524/151; 524/153; 524/718; 523/223; 525/98; 525/99; 526/204; 526/329.7
[58] Field of Search ................. 524/94, 100, 109, 151, 524/153, 718; 523/223; 525/98, 99; 526/204, 329.7

[56] References Cited

U.S. PATENT DOCUMENTS

| | | | |
|---|---|---|---|
| 3,734,872 | 5/1973 | Wakimoto et al. | 524/718 |
| 3,880,796 | 4/1975 | Christenson et al. | 260/33.6 |
| 4,232,135 | 4/1980 | Bentley et al. | 525/509 |
| 4,290,932 | 9/1981 | Wright et al. | 525/198 |
| 4,314,933 | 2/1982 | Beiner | 260/45.75 N |
| 4,522,990 | 6/1985 | Andrews | 526/180 |
| 4,550,136 | 10/1985 | Hosch | 524/718 |
| 4,593,064 | 6/1986 | Hosch | 524/718 |
| 4,708,979 | 11/1987 | Pedrazzetti | 523/223 |
| 4,894,399 | 1/1990 | Rody et al. | 524/91 |

FOREIGN PATENT DOCUMENTS

| | | |
|---|---|---|
| 0003166 | 7/1979 | European Pat. Off. . |
| 0028886 | 5/1981 | European Pat. Off. . |
| 0119051 | 9/1984 | European Pat. Off. . |
| 58-15502 | 1/1983 | Japan . |
| 59-149959 | 8/1984 | Japan . |
| 1156012 | 6/1969 | United Kingdom . |
| 1538151 | 1/1979 | United Kingdom . |
| 2137935 | 4/1983 | United Kingdom . |

OTHER PUBLICATIONS

A. N. Theodore et al., J. Coatings Tech. 57, 67 (1985).

Primary Examiner—Kriellion S. Morgan
Attorney, Agent, or Firm—Luther A. R. Hall

[57] ABSTRACT

Light-stabilized polymer microparticles, which contain at least one light stabilizer, and processes for the preparation of these microparticles by polymerization of suitable monomers, at least a part of the polymerization being carried out in the presence of at least one light stabilizer, are described. The polymer microparticles can be used in coating compositions which comprise a disperse phase containing these particles and a liquid continuous phase.

Coatings and finishes based on the compositions according to the invention are distinguished by improved weathering resistance, in particular by a high light stability.

5 Claims, No Drawings

LIGHT-STABILIZED POLYMER MICROPARTICLES

This application is a continuation of application Ser. No. 611,399, filed Nov. 7, 1990 now abandoned, which is a continuation of Ser. No. 937,594 filed Dec. 3, 1986 now abandoned.

The invention relates to light-stabilized polymer microparticles, to processes for preparing them and the dispersions as well as coating compositions containing them.

Recently, due to the requirement of minimizing pollution of the environment, there has been considerable interest in coating technology in increasing the proportion of the film-forming material present in the coating compositions and in reducing the proportions of inert liquid diluents which must be evaporated during the preparation of the coating and during the drying and curing.

Coating compositions with a high proportion of film-forming material have been disclosed, for example, by EP-A 3,166 and EP-A 119,051 and by the literature cited in each of these, they have in general the structure of a liquid continuous phase and a disperse phase which, if appropriate, contains a high proportion of insoluble polymer microparticles.

The resulting films and coatings have a composite character, namely a polymer matrix or continuous phase derived from polymer which was originally in solution, and a disperse phase derived from the polymer microparticles.

Coating compositions containing known microparticles have, however, only an inadequate light stability, since hitherto only the coating mixture has been stabilized as such by physical admixture of a light stabilizer to the homogeneous liquid phase.

By contrast, the sometimes high microparticle proportion of such coatings is unstabilized.

It has now been found that the light stability of coatings and paints, in particular baking paints, containing a proportion of microparticles can be improved if appropriate light stabilizers are incorporated into the microparticles and the latter are thus protected directly from weathering effects, in particular irradiation.

The invention therefore relates to light-stabilized polymer microparticles having a particle size distribution of 0.01–20 μm, which are obtainable by polymerization in a manner known per se from one or several different ethylenically mono- or poly-unsaturated monomeric compounds or/and one or several different monomers from the group comprising the polyalcohols, polycarboxylic acids, hydroxycarboxylic acids, lactones, aminocarboxylic acids and polyamines, and which microparticles contain 0.1 to 30% by weight relative to the monomers, of one or more light stabilizer(s).

Preferably, at least part of the polymerization of the monomers is here carried out in the presence of the light stabilizer(s).

Microparticles are here to be understood as meaning polymer particles having a size or size distribution within the said colloidal dimensions, which particles are insoluble in the continuous liquid phase of coating compositions. The expression polymer microparticle is well known in coating technology and hence in the relevant literature. An essential feature of the microparticles, apart from their size, is that they contain a crosslinked core or consist of the latter. In the ideal form, the microparticles have an approximately spherical shape. In place of the term "microparticle", the term "microgel" is also usual in the literature. Therefore, the microparticles according to the invention can also be described as light-stabilized polymer microgels.

The polymer, of which the microparticles consist, can be either an addition polymer, in particular a homopolymer or copolymer of one or more ethylenically unsaturated monomer components or a condensation polymer, for example a polyester or polyamide, or a combination of the two types of polymer.

If appropriate, the microparticles can have been plasticized with a plasticizer.

If the microparticles represent an addition polymer, examples of suitable monomers are ethene, propene, butene, isoprene, butadiene, acrylic acid and the methacrylic acid and esters thereof, such as methyl methacrylate, butyl methacrylate, ethyl acrylate, butyl acrylate and 2-ethylhexyl acrylate, vinyl ethers, vinyl esters such as vinyl acetate and the vinyl esters of "Versatic Acid" ®, vinyl halides, for example vinyl chloride and vinylidene chloride, vinylaromatics such as styrene, vinyltoluene and tert.-butylstyrene, or $\alpha, \beta$-unsaturated nitriles such as acrylonitrile or methacrylonitrile. Acrylate and methacrylate polymers and their copolymers are preferred.

Crosslinked addition polymer microparticles are obtained, for example, by adding to the monomer mixture a certain quantity of monomers which, in addition to the unsaturated, polymerizable groupings, contain complementary reactive groups, for example glycidyl methacrylate or methacrylic acid. Suitable complementary reactive groups are described in British Patent Specification 1,156,012, where information on the monomers to be used and a process for the preparation of crosslinked addition polymer microparticles are also to be found. The microparticles prepared according to British Patent Specification 1,156,012 contain groups which have not co-reacted during the preparation but can be caused to undergo a co-reaction, for example by means of subsequent heating, and thus form crosslinks.

In another method for obtaining crosslinked addition polymer microparticles, a small proportion of monomers which are bifunctional with respect to the polymerization reaction, for example ethylene glycol dimethacrylate or divinylbenzene, are incorporated into the monomers subjected to the polymerization. Further examples of suitable bifunctional monomers are mentioned, for example, in U.S. Pat. No. 4,290,932.

It is a preferred feature of the polymer microparticles according to the invention that, as a constituent of coating compositions, they can participate in the curing thereof via reactive groups capable of condensation polymerization. In the case of addition polymer microparticles, this is accomplished, for example, with ethylenically unsaturated monomers which contain, for example, hydroxyl groups or carboxyl groups. Examples are hydroxyalkyl acrylates or methacrylates, such as hydroxyethyl acrylate, hydroxyisopropyl methacrylate, or unsaturated carboxylic acids such as acrylic acid or methacrylic acid. If crosslinkable polymer microparticles are involved, and the corresponding monomer mixture contains, in addition to the monomers with reactive groups capable of curing a coating, also other monomers with complementary reactive groups, for example glycidyl groups, the former are employed in an excess.

Alternatively, the microparticles can be rendered simultaneously self-crosslinkable and crosslinkable with other constituents of coating compositions, by adding monomers such as N-butoxymethyl-(meth)acrylamide to the monomer mixture.

Suitable monomeric starting materials for the preparation of condensation polymer microparticles are those which are generally known for the preparation of such polymers by melt polymerization or solution polymerization techniques. Examples of suitable materials in the case of polyester microparticles are polyhydric alcohols, for example ethylene glycol, propylene glycol, butylene glycol, 1,6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexanetriol, oligomers of styrene and allyl alcohol (for example the material marketed by Monsanto Chemical Co. under the name RJ 100) and the condensation products of trimethylolpropane with ethylene oxide or propylene oxide (for example the products known in the trade name as "Niax" triols) together with polycarboxylic acids, for example succinic acid or its anhydride, adipic acid, azelaic acid, sebacic acid, maleic acid or its anhydride, fumaric acid, muconic acid, itanconic acid, phthalic acid or its anhydride, isophthalic acid, terephthalic acid, trimellitic anhydride, pyromellitic acid or its anhydride, truxinic acid and truxillic acid. In the case of polyamide particles, suitable monomeric starting materials are aminocarboxylic acids, for example 6-aminocaproic acid or 11-aminoundecylic acid or the corresponding lactams, and/or polyamines such as ethylenediamine, propylenediamine, hexamethylenediamine, diethylenetriamine, triethylenetetramine or tris-(aminomethyl)-methane together with the abovementioned polycarboxylic acids.

Crosslinking of the condensation polymer microparticles is accomplished, as already described for the addition polymer microparticles, for example by adding a proportion of one or more starting monomers, which have a functionality higher than 2, to the mixture which is to be polymerized. Moreover, it is preferred that the condensation polymer microparticles as a constituent of coating compositions participate in the curing of the latter. If the microparticles are prepared using the abovementioned monomers, they frequently already have a number, sufficient for this purpose, of suitable reactive groups, for example, hydroxyl, amino or carboxyl groups, as end groups in the polymer.

If additional reactive groups are required, suitable monomers which have a functionality greater than 2 and which, under the conditions of particle preparation, give maximum branching but cannot crosslink, are introduced into the monomer mixture.

The polymer microparticles according to the invention can, for example, consist solely of the crosslinked polymer core which then contains the light stabilizer. However, they then frequently do not form stable dispersions (the particles settle out) or the dispersion must be additionally stabilized by means of dispersants. Moreover, the distribution in the liquid continuous phase of the coating composition, in which the microparticles can be employed, is not ideal. It is therefore particularly preferred to modify the microparticles in such a way that stable dispersions in numerous dispersion media and good distribution in the liquid continuous phase of coating compositions are ensured. A preferred modification comprises attaching substantially linear or slightly branched polymer chains to the actual microparticle core, for example by polymerization or condensation onto the core (grafting). These linear polymers contain functional groups having such a ratio of hydrophilic and hydrophobic functions that the dispersibility of the resulting complete microparticle is enhanced and a stable dispersion is thus ensured. The linear or slightly branched polymers suitable for grafting onto the polymer microparticle core are also termed "amphipathic" dispersants below. Of course, the dispersibility in certain solvents can also be ensured in other ways, for example by the introduction of suitable combinations of ionic groups.

Polymer microparticles according to the invention, which contain an amphipathic dispersant, can contain the light stabilizer(s) in the core, in the amphipathic dispersant or in both. Different light stabilizers can then be present in the core and in the amphipathic dispersant in each case. The light stabilizer is incorporated into the amphipathic dispersant in the same way as into the core, namely by carrying out the preparation thereof (polymerization) in the presence of the light stabilizer.

In principle, the light stabilizer(s) can be chemically anchored in the polymer microparticle (the light stabilizer participates in the polymerization) or only be physically occluded. Both cases give the desired light stabilization, but chemical incorporation is preferred.

Representative of virtually all known classes of light stabilizers, for example sterically hindered amines, 2-(2-hydroxyphenyl)-benzotriazoles, oxalic acid anilides, 2-hydroxybenzophenones, hydroxyphenyltriazines or cinnamic acid derivatives, can be used for the light-stabilization of the microparticles. The light stabilizers preferred here are 2-(2-hydroxyphenyl)-benzotriazoles and especially sterically hindered amines.

If the light stabilizer belongs to the class of sterically hindered amines, these are preferably cyclic amines, in particular derivatives of 5-membered, 6-membered, or 7-membered heterocyclic ring systems with 1 or 2 N atoms, which have tertiary C atoms in both the ortho-positions to the N atom, thus effecting steric hindrance of the N atom.

Examples of such ring systems are 2,2,5,5-tetrasubstituted pyrrolidines, imidazolidones or oxazolines of the formulae

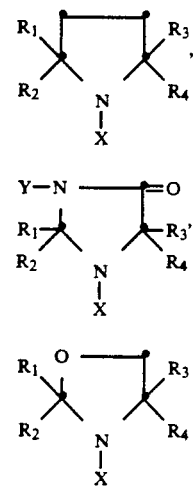

or 2,2,6,6-tetrasubstituted piperazinones and piperazinediones of the formulae

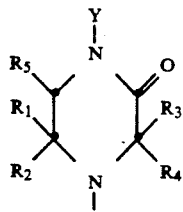

and

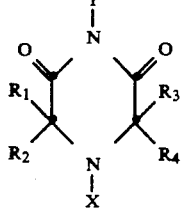

or diazacycloheptanones of the formula

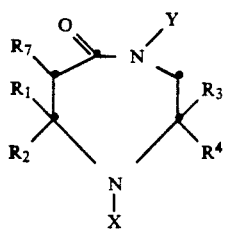

in which $R_1$, $R_2$, $R_3$ and $R_4$ are aliphatic hydrocarbon radicals which may be combined to form spiro rings, $R_5$ and $R_7$ are hydrogen or alkyl, X is hydrogen, oxyl oxygen, OH or a monovalent organic radical and Y is hydrogen or a monovalent or divalent organic radical, for example of the formula

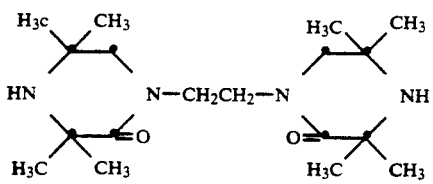

Decahydroquinolines disubstituted in the 2-position are also representatives of sterically hindered amines.

Amongst the sterically hindered amine compounds, 2,2,6,6-tetraalkylpiperidine derivatives are of particular importance. These are compounds which contain in the molecule at least one group of the formula I

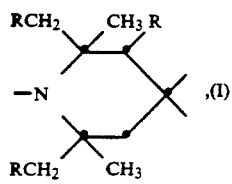

in which R is hydrogen or methyl. The light stabilizer can contain one or more such groups of the formula I, for example it can be mono-, bis-, tris-, tetra- or oligo-piperidine compound. Those piperidine derivatives are preferred which contain one or more groups of the formula I, in which R is hydrogen and those in which the ring nitrogen does not carry a hydrogen atom.

Most of these piperidine light stabilizers carry polar substituents in the 4-position of the piperidine ring or carry a spiro ring in this position.

The following classes or piperidines compounds are of particular importance.

a) Compounds of the formula II

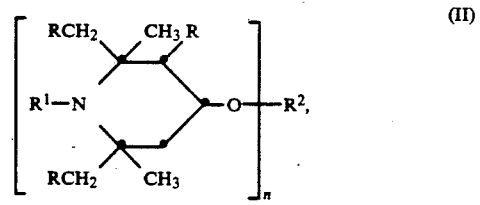

in which n is a number from 1 to 4, preferably 1 or 2, R is hydrogen or methyl, $R^1$ is hydrogen, oxyl, $C_1$–$C_{18}$alkyl, $C_3$–$C_8$-alkenyl, $C_3$–$C_8$-alkynyl, $C_7$–$C_{12}$-aralkyl, $C_1$–$C_8$-alkanoyl, $C_3$–$C_5$-alkenoyl, glycidyl or a group —$CH_2CH(OH)$—Z, with Z being hydrogen, methyl or phenyl, $R^1$ preferably being $C_1$–$C_{12}$-alkyl, allyl, benzyl, acetyl or acryloyl, and $R^2$, if n=1, is hydrogen, $C_1$–$C_{18}$-alkyl which may be interrupted by one or more oxygen atoms, cyanoethyl, benzyl, glycidyl, a monobasic radical of an aliphatic cycloalphatic, araliphatic, unsaturated or aromatic carboxylic acid, carbamic acid or phosphorus-containing acid or a monovalent silyl radical, preferably a radical of an aliphatic carboxylic acid having 2 to 18 C atoms, cycloaliphatic carboxylic acid having 7 to 15 C atoms, an α, β-unsaturated carboxylic acid having 3 to 5 C atoms or an aromatic carboxylic acid having 7 to 15 C atoms, or, if n=2, $R^2$ is $C_1$–$C_{12}$-alkylene, $C_4$–$C_{12}$-alkenylene, xylylene, a dibasic radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, a cycloaliphatic or aromatic dicarboxylic acid having 8–14 C atoms or an aliphatic, cycloaliphatic or aromatic dicarbamic acid having 8–14 C atoms, or, if n=3, $R^2$ is a tribasic radical of an aliphatic, cycloaliphatic or aromatic tricarboxylic acid, an aromatic tricarbamic acid or a phosphorus-containing acid or a trivalent silyl radical, and, if n=4, $R^2$ is a tetrabasic radical of an aliphatic, cycloaliphatic or aromatic tetracarboxylic acid.

Any $C_1$–$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

$C_1$–$C_{18}$-alkyl radicals $R^1$ or $R^2$ can be, for example, the groups listed above and in addition also, for example, n-tridecyl, n-tetradecyl, n-hexadecyl, or n-octadecyl.

A $C_3$–$C_8$-alkenyl radical $R^1$ can be, for example, 1-propenyl, allyl, methallyl, 2-butenyl, 2-pentenyl, 2-hexenyl, 2-octenyl or 4-tert.-butyl-2-butenyl.

A $C_3$–$C_8$-alkynyl radical $R^1$ is preferably propargyl.

A $C_7$–$C_{12}$-aralkyl radical $R^1$ is in particular phenethyl or especially benzyl.

A $C_1$–$C_8$-alkanoyl radical $R^1$ is, for example, formyl, propionyl, butyryl, octanoyl or preferably acetyl, and $C_3$–$C_5$-alkenoyl is especially acryloyl.

If $R^2$ is a monobasic radical of a carboxylic acid, this is, for example, an acetic acid, caproic acid, stearic acid, acrylic acid, methacrylic acid, benzoic acid or β-(3,5-di-tert.-butyl-4-hydroxyphenyl)-propionic acid radical.

If $R^2$ is a dibasic radical of a dicarboxylic acid, it is, for example, a malonic acid, adipic acid, suberic acid, sebacic acid, maleic acid, phthalic acid, dibutylmalonic acid, dibenzylmalonic acid, butyl-(3,5-di-tert.-butyl-4-hydroxybenzyl)-malonic acid or bicycloheptenedicarboxylic acid radical.

If $R^2$ is a tribasic radical of a tricarboxylic acid, it is, for example a trimellitic acid or nitrilotriacetic acid radical.

If $R^2$ is a tetrabasic radical of tetracarboxylic acid, it is, for example, the tetrabasic radical of butane-1,2,3,4-tetracarboxylic acid or of pyromellitic acid.

If $R^2$ is a dibasic radical of a dicarbamic acid, it is, for example, a hexamethylene-dicarbamic acid or 2,4-toluylene-dicarbamic acid radical.

Those compounds of the formula II should be especially mentioned in which n is 1 or 2, R is hydrogen, $R^1$ is hydrogen, oxyl, $C_1-C_6$-alkyl, $C_3-C_8$-alkenyl, for example allyl, benzyl, $C_2-C_6$-alkanoyl, $C_3-C_5$-alkenoyl, for example acryloyl or methacryloyl, glycidyl or $-CH_2CH(OH)-Z_1$ with $Z_1$ being hydrogen or methyl, and $R_2$, if n=1, is hydrogen, $C_1-C_{12}$-alkyl, benzyl or the radical of an aliphatic carboxylic acid having 2-18 C atoms, an α, β-unsaturated carboxylic acid having 3-5 C atoms or an aromatic carboxylic acid having 7-15 C atoms, and, if n=2, $R_2$ is $C_1-C_6$-alkylene, $C_4-C_8$-alkenylene or the radical of an aliphatic saturated or unsaturated dicarboxylic acid having 2-18 C atoms.

Examples of tetraalkylpiperidine compounds from this class are the following compounds: 1) 4-hydroxy-2,2,6,6-tetramethylpiperidine, 2) 1-allyl-4-hydroxy-2,2,6,6-tetramethylpiperidine, 3) 1-benzyl-4-hydroxy-2,2,6,6-tetramethylpiperidine, 4) 1(4-tert.-butyl-2-butenyl)-4-hydroxy-2,2,6,6-tetramethylpiperidine, 5) 4-stearoyloxy-2,2,6,6-tetramethylpiperidine, 6) 1-ethyl-4-salicyloyloxy-2,2,6,6-tetramethylpiperidine, 7) 4-methacryloyloxy-1,2,2,6,6-pentamethylpiperidine, 8) 1,2,2,6,6-pentamethylpiperid-4-yl β(3,5-di-tert.-butyl-4-hydroxyphenyl)-propionate, 9) di-(1-benzyl-2,2,6,6-tetramethylpiperid-4-yl) maleate, 10) di-(2,2,6,6-tetramethylpiperid-4-yl) adipate, 11) di-(2,2,6,6-tetramethylpiperid-4-yl) sebacate, 12) di-(1,2,3,6-tetramethyl-2,6-diethyl-piperid-4-yl) sebacate, 13) di(1-allyl-2,2,6,6-tetramethylpiperid-4-yl) phthalate, 14) 1-propargyl-4-β-cyanoethoxy-2,2,6,6-tetramethylpiperidine, 15) 1-acetyl-2,2,6,6-tetramethylpiperid-4-yl acetate, 16) tri-(2,2,6,6-tetramethylpiperid-4-yl) trimellitate, 17) 1-acryloyl-4-benzyloxy-2,2,6,6-tetramethylpiperidine, 18) di(1,2,2,6,6-pentamethylpiperid-4-yl) dibutylmalonate, 19) di-(1,2,2,6,6-pentamethylpiperid-4-yl) butyl-(3,5-di-tert.-butyl-4-hydroxybenzyl)-malonate, 20) di-(1,2,2,6,6-pentamethylpiperid-4-yl) dibenzylmalonate, 21) di-(1,2,3,6-tetramethyl-2,6-diethylpiperid-4-yl) dibenzylmalonate, 22) hexane-1',6'-bis-(4-carbamoyloxy-1-n-butyl-2,2,6,6-tetramethylpiperidine), 23) toluene-2',4'-bis-(4-carbamoyloxy-1-n-propyl-2,2,6,6-tetramethylpiperidine), 24) dimethyl-bis-(2,2,6,6-tetramethylpiperid-4-yloxy)-silane, 25) phenyl-tris-(2,2,6,6-tetramethylpiperid-4-yloxy)-silane, 26) tris-(1-propyl-2,2,6,6-tetramethylpiperid-4-yl) phosphite, 27) tris-(1-propyl-2,2,6,6-tetramethylpiperid-4-yl) phospate, 28) bis-(1,2,2,6,6-pentamethylpiperid-4-yl) phenylphosphonate, 29) di-(1,2,2,6,6-pentamethylpiperid-4-yl) sebacate, 29a) 4-hydroxy-1,2,2,6,6-pentamethylpiperidine, 29b) 4-hydroxy-N-hydroxyethyl-2,2,6,6-tetramethylpiperidine, 29c) 4hydroxy-N-(2-hydroxypropyl)-2,2,6,6-tetramethylpiperidine and 29d) 1-glycidyl-4-hydroxy-2,2,6,6-tetramethylpiperidine.

b) Compounds of the formula (III)

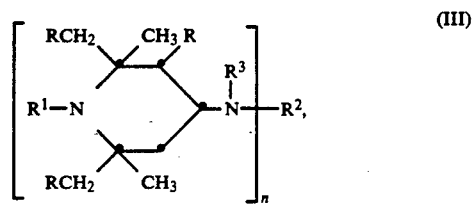

in which n is the number 1 or 2, R and $R^1$ are as defined under a) including the preferred definitions, $R^3$ is hydrogen, $C_1-C_{12}$-alkyl, $C_2-C_5$-hydroxyalkyl, $C_5-C_7$-cycloalkyl, $C_7-C_8$-aralkyl, $C_2-C_{18}$-alkanoyl, $C_3-C_5$-alkenoyl or benzoyl and $R^4$, if n=1, is hydrogen, $C_1-C_{18}$-alkyl, $C_3-C_8$-alkenyl, $C_5-C_7$-cycloalkyl, $C_1-C_4$-alkyl substituted by a hydroxyl, cyano, alkoxycarbonyl or carbamide group, glycidyl or a group of the formula $-CH_2-CH(OH)-Z$ or of the formula $-CONH-Z$, with Z being hydrogen, methyl or phenyl, or, if n=2, $R^4$ is $C_2-C_{12}$-alkylene, $C_6-C_{12}$-arylene, xylylene, a $-CH_2-(CH(OH)-CH_2-$ group or a $-CH_2-CH(OH)-CH_2-O-D-O-CH_2-CH(OH)-CH_2-$ group, with D being $C_2-C_{10}$-alkylene, $C_6-C_{15}$-arylene or $C_6-C_{12}$-cycloalkylene, or $R^4$, provided that $R^3$ is not alkanoyl, alkenoyl or benzoyl, can also be a dibasic radical of an aliphatic, cycloaliphatic or aromatic dicarboxylic acid or dicarbamic acid or the group $-CO-$, or $R^3$ and $R^4$ together, if n=1, can be the dibasic radical of an aliphatic, cycloaliphatic or aromatic 1,2- or 1,2-dicarboxylic acid.

Any $C_1-C_{12}-$ or $C_1-C_{18}$-alkyl substituents are as already defined under a).

Any $C_5-C_7$-cycloalkyl substituents are especially cyclohexyl.

A $C_7-C_8$-aralkyl radical $R^3$ is in particular phenylethyl or especially benzyl. A $C_2-C_5$-hydroxyalkyl radical $R^3$ is especially 2-hydroxyethyl or 2-hydroxypropyl.

A $C_2-C_{18}$-alkanoyl radical $R^3$ is, for example propionyl, butyryl, octanoyl, dodecanoyl, hexadecanoyl or octadecanoyl, and preferably acetyl, and $C_3-C_5$-alkenoyl is especially acryloyl.

A $C_2-C_8$-alkenyl radical $R^4$ is, for example, allyl, methallyl, 2-butenyl, 2-pentenyl, 2-hexenyl or 2-octenyl.

A $C_1-C_4$-alkyl radical $R^4$ which is substituted by a hydroxyl, cyano, alkoxycarbonyl or carbamide group can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl.

Any $C_2-C_{12}$-alkylene substituents are, for example, ethylene, propylene, 2,2-dimethylpropylene, tetramethylene, hexamethylene, octamethylene, decamethylene or dodecamethylene.

Any $C_6-C_{15}$-arylene substituents are, for example, o-, m- or p-phenylene, 1,4-naphthylene, 4,4'-diphenylene or

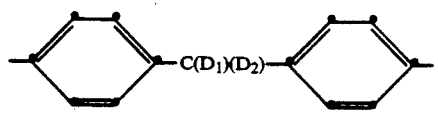

in which $D_1$ and $D_2$ independently of one anther are hydrogen or methyl.

A $C_6$-$C_{12}$-cycloalkylene radical D is especially cyclohexylene.

Those compounds of the formula III should especially be mentioned in which R and $R^1$ have the preferred meanings defined under a), $R^3$ is hydrogen or $C_1$-$C_6$-alkyl and $R^4$, if $n=1$, is hydrogen, $C_1$-$C_{12}$-allyl, $C_3$-$C_8$-alkenyl, $C_1$-$C_4$-alkyl substituted by hydroxyl, cyano or carbamido, $CH_2CH(OH)$—Z or $CONH$—Z and, if $n=2$, $R^4$ is as defined under the formula III, with the exception of $R^3+R^4$ combined.

Examples of tetraalkylpiperidine compounds from this class are the following compounds: 30) N,N'-bis-(2,2,6,6-tetramethylpiperid-4-yl)-hexamethylene-1,6-diamine, 31) N,N'-bis-(2,2,6,6-tetramethylpiperid-4-yl)-hexamethylene-1,6-diacetamide, 32) 1-acetyl-4-(N-cyclohexylacetamide)-2,2,6,6-tetramethylpiperidine, 33) 4-benzoylamino-2,2,6,6-tetramethylpiperidine, 34) N,N'-bis-(2,2,6,6-tetramethylpiperid-4-yl)-N,N'-dibutyl-adipamide, 35) N,N'-bis-(2,2,6,6-tetramethylpiperid-4-yl)-N,N'-dicylohexyl-2-hydroxypropylene-1,3-diamine, 36) N,N'-bis-(2,2,6,6-tetramethylpiperid-4-yl)-p-xylylenediamine, 37) the compound of the formula

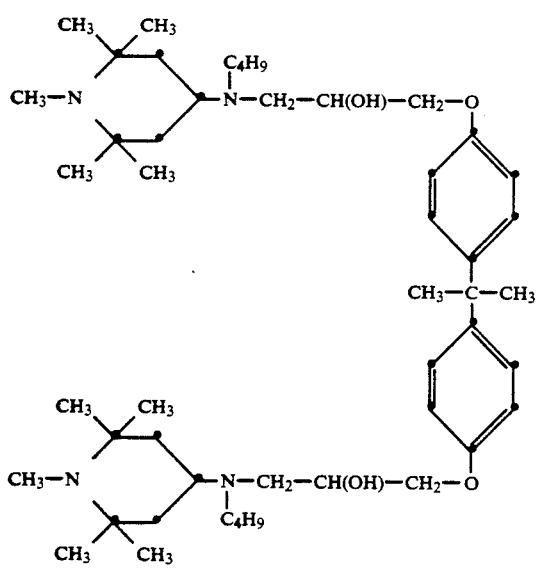

38) 4-(bis-2-hydroxyethylamino)-1,2,2,6,6-pentamethylpiperidine, 39) 4-(3-methyl-4-hydroxy-5-tert.-butyl-benzamido)-2,2,6,6-tetramethylpiperidine and 40) 4-methacrylamido-1,2,2,6,6-pentamethylpiperidine.

c) Compounds of the formula (IV)

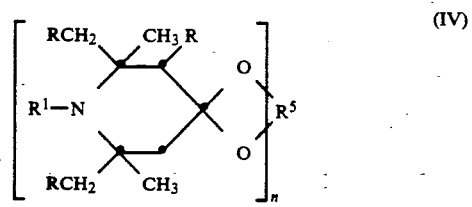

in which n is the number 1 or 2, R and $R^1$ are as defined under a) including the preferred definitions and $R^5$, if $n=1$, is $C_2$-$C_8$-alkylene or -hydroxyalkylene or $C_4$-$C_{22}$-acyloxyalkylene and, if $n=2$, is the group $(—CH_2)_2C(CH_2—)_2$ A $C_2$-$C_8$-alkylene or -hydroxyalkylene radical $R^5$ is, for example, ethylene, 1-methylethylene, propylene, 2-ethylpropylene or 2-ethyl-2-hydroxymethylpropylene.

A $C_4$-$C_{22}$-acyloxyalkylene radical $R^5$ is, for example, 2-ethyl-2-acetoxymethylpropylene.

Thus, in the case of $n=2$, $R^5$ is the complement to form a spiro6-ring and, in the case of $n=1$, preferably is the complement to form a spiro-5- or -6-ring.

Examples of tetraalkylpiperidine compounds from this class are the following compounds: 41) 9-aza-8,8,10,10-tetramethyl-1,5-dioxaspiro[5.5]undecane, 42) 9-aza-8,8,10,10-tetramethyl-3-ethyl-1,5-dioxaspiro[5.5]-undecane, 43) 8-aza-2,7,7,8,9,9-hexamethyl-1,4-dioxaspiro[4.5]-decane, 44) 9-aza-3-hydroxymethyl-3-ethyl-8,8,9,10,10-pentamethyl-1,5-dioxaspiro [5.5]-undecane, 45) 9-aza-3-ethyl-3-acetoxymethyl-9-acetyl-8,8,10,10-tetramethyl-1,5-dioxaspiro[5.5]-undecane and 46) 2,2-,6,6-tetramethylpiperidine-4-spiro-2'-(1',3'-dioxane)-5=-spiro-5''-(1'',3''-dioxane)-2''-spiro-4''-(2''',2''',6''',6'''-tetramethylpiperidine).

d) Compounds of the formulae VA, VB and VC

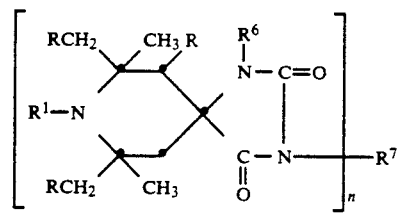

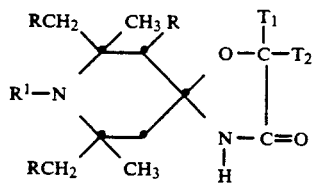

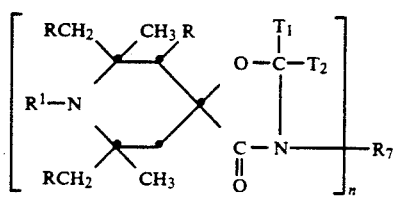

in which n is the number 1 or 2, R and $R^1$ are as defined under a) including the preferred definitions, $R^6$ is hydrogen, $C_1$-$C_{12}$-alkyl, allyl, benzyl, glycidyl or $C_2$-$C_6$-alkoxyalkyl and $R^7$, if $n=1$, is hydrogen, $C_1$-$C_{12}$-alkyl, $C_3$–$C_5$-alkenyl, $C_7$–$C_9$-aralkyl, $C_5$–$C_7$-cycloalkyl, $C_2$–$C_4$-hydroxyalkyl, $C_2$–$C_6$-alkoxyalkyl, $C_6$–$C_{10}$-aryl, glycidyl or a group of the formula —$(CH_2)_p$—COO—Q or of the formula —$(CH_2)_p$—O—CO—Q, wherein p is 1 or 2 and Q is $C_1$–$C_4$-alkyl or phenyl, or, if n=2, $R^7$ is $C_2$–$C_{12}$-alkylene, $C_4$–$C_{12}$-alkenylene, $C_6$–$C_{12}$-arylene, a group —$CH_2$—CH(OH)—$CH_2$O—D—O—$CH_2$—CH(OH)—$CH_2$—, wherein d is $C_2$–$C_{10}$-alkylene, $C_6$–$C_{15}$-arylene or $C_6$–$C_{12}$-cycloalkylene or a group —$CH_2$CH(OZ')$CH_2$-(O$CH_2$—CH(OZ')$CH_2$)$_2$— wherein Z' is hydrogen, $C_1$–$C_{18}$-alkyl, allyl, benzyl, $C_2$–$C_{12}$-alkanoy or benzoyl, and $T_1$ and $T_2$ independently of one another are hydrogen, $C_1$–$C_{18}$-alkyl or are $C_6$–$C_{10}$-aryl or $C_7$–$C_9$-aralkyl which are unsubstituted or substituted by halogen or $C_1$–$C_4$-alkyl, or $T_1$ or $T_2$, together with the C atom linking them, form a $C_5$–$C_{12}$-cycloalkane ring.

Any $C_1$–$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$–$C_{18}$-alkyl substituents can be, for example, the groups listed above and additionally also, for example, n-tridecyl, n-tetradecyl, n-hexadecyl or n-octadecyl.

Any $C_2$–$C_6$-alkoxyalkyl substituents are, for example, methoxymethyl, ethoxymethyl, propoxymethyl, tert.-butoxymethyl, ethoxyethyl, ethoxypropyl, n-butoxyethyl, tert.-butoxyethyl, isopropoxyethyl or propoxypropyl.

A $C_3$–$C_5$-alkenyl radical $R^7$ is, for example, 1-propenyl, allyl, methallyl, 2-butenyl or 2-pentenyl.

$C_7$–$C_9$-aralkyl radicals $R^7$, $T_1$ and $T_2$ are in particular phenethyl or especially benzyl. $T_1$ and $T_2$ forming a cycloalkane ring together with the C atom can be, for example, a cyclopentane, cyclohexane, cyclooctane or cyclododecane ring.

A $C_2$–$C_4$-hydroxyalkyl radical $R^7$ is, for example, 2-hydroxyethyl, 2-hydroxypropyl, 2-hydroxybutyl or 4-hydroxybutyl.

$C_6$–$C_{10}$-aryl radicals $R^7$, $T_1$ and $T_2$ are in particular phenyl or α- or β-naphthyl which are unsubstituted or substituted by halogen or $C_1$–$C_4$-alkyl.

A $C_2$–$C_{12}$-alkylene radical $R^7$ is, for example, ethylene, propylene, 2,2-dimethylpropylene, tetramethylene, hexamethylene, octamethylene, decamethylene or dodecamethylene.

A $C_4$–$C_{12}$-alkenylene radical $R^7$ is in particular 2-butenylene, 2-pentenylene or 3-hexenylene.

A $C_6$–$C_{12}$-arylene radical $R^7$ is, for example, o-, m- or p-phenylene, 1,4-naphthylene or 4,4'-diphenylene.

A $C_2$–$C_{12}$-alkanoyl radical Z' is, for example, propionyl, butyryl, octanoyl or dodecanoyl, and preferably acetyl.

A $C_2$–$C_{10}$-alkylene, $C_6$–$C_{15}$-arylene or $C_6$–$C_{12}$-cycloalkylene radical D is as preferably defined under b).

Examples of tetraalkylpiperidine compounds from this class are the following compounds: 47) 3-benzyl-1,3,8-triaza-7,7,9,9-tetramethylspiro[4.5]decane-2,4-dione, 48) 3-n-octyl-1,3,8-triaza-7,7,9,9-tetramethylspiro[4.5]-decane-2,4-dione, 49) 3-allyl-1,3,8-triaza-1,7,7,9,9-pentamethylspiro[4.5]-decane-2,4-dione, 50) 3-glycidyl-1,3,8-triaza-7,7,8,9,9-pentamethylspiro[4.5]-decane-2,4-dione, 51) 2-isopropyl-7,7,9,9-tetramethyl-1-oxa-3,8-diaza-4-oxo-spiro[4.5]-decane, 52) 2,2-dibutyl-7,7,9,9-tetramethyl-1-oxa-3,8-diaza-4-oxa-spiro[4.5]-decane, 53) 2,2,4,4-tetramethyl-7-oxa-3,20-diaza-21-oxodispiro[5.5.11.2]heneicosane, 54) 2-butyl-7,7,9,9-tetramethyl1-oxa-4.8-diaza-3-oxo-spiro[4.5]decane and 54a) 8-acetyl-3-dodecyl-1,3,8-triaza-7,7,9,9-tetramethyl-spiro[4.5]decane-2,4-dione or the compounds of the following formulae:

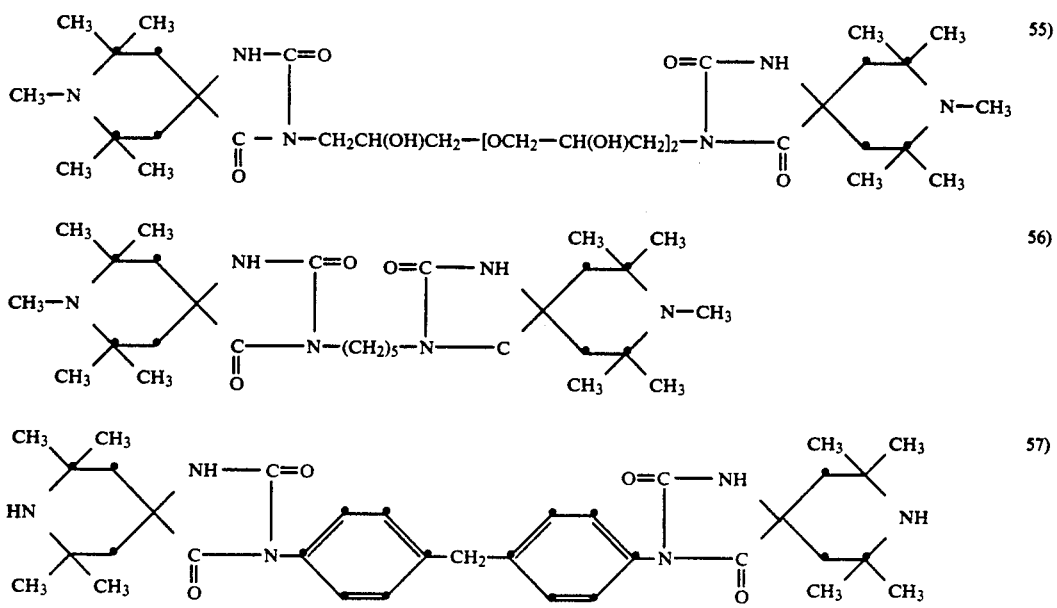

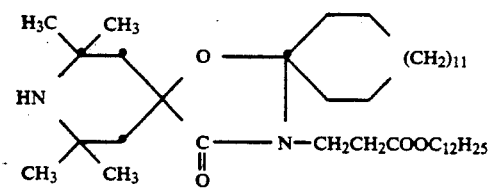

e) Compounds of the formula VI

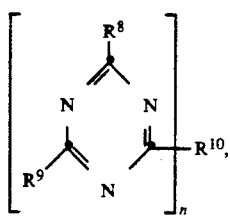
(VI)

in which n is the number 1 or 2 and $R^8$ is a group of the formula

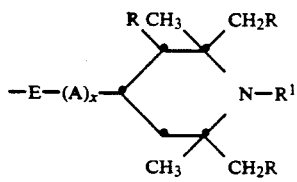

in which R and $R^1$ are as defined under a) including the preferred definitions, E is —O— or —$NR^{11}$, A is $C_2$-$C_6$-alkylene or —$(CH_2)_3$—O— and x is one of the numbers 0 or 1, $R^9$ is identical to $R^8$ or one of the groups —$NR^{11}R^{12}$, —$OR^{13}$, —$NHCH_2OR^{13}$ or —$N(CH_2OR^{13})_2$, $R^{10}$ is, if n=1, identical to $R^8$ or $R^9$ and, if n=2, a group —E—B—E—, wherein B is $C_2$-$C_6$-alkylene which may be interrupted by —$N(R^{11})$—, $R^{11}$ is $C_1$—$C_{12}$-alkyl, cyclohexyl, benzyl or $C_1$-$C_4$-hydroxyalkyl or a group of the formula

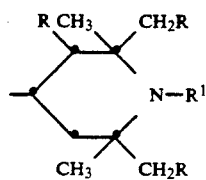

$R^{12}$ is $C_1$-$C_{12}$-alkyl, cyclohexyl, benzyl or $C_1$-$C_4$-hydroxyalkyl and $R^{13}$ is hydrogen, $C_1$-$C_{12}$-alkyl or phenyl, or $R^{11}$ and $R^{12}$ together are $C_4$-$C_5$-alkylene or -oxaalkylene, for example

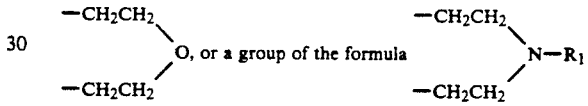

or $R^{11}$ and $R^{12}$ can also each be a group of the formula

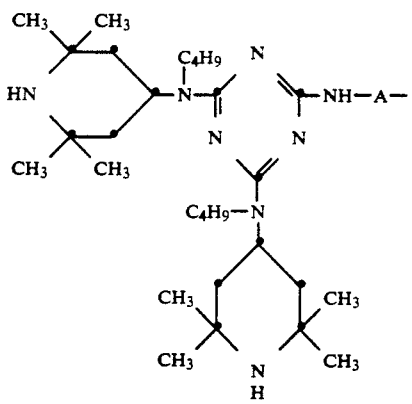

Any $C_1$-$C_{12}$-alkyl substituents are, for example, methyl, ethyl, n-propyl, n-butyl, sec.-butyl, tert.-butyl, n-hexyl, n-octyl, 2-ethylhexyl, n-nonyl, n-decyl, n-undecyl or n-dodecyl.

Any $C_1$-$C_4$-hydroxyalkyl substituents are, for example, 2-hydroxyethyl, 2-hydroxypropyl, 3-hydroxypropyl, 2-hydroxybutyl or 4-hydroxybutyl.

A $C_2$-$C_6$-alkylene radical A is, for example, ethylene, propylene, 2,2-dimethylpropylene, tetramethylene or hexamethylene.

If $R^{11}$ and $R^{12}$ together are $C_4$-$C_5$-alkylene or oxaalkylene, they are, for example, tetramethylene, pentamethylene or 3-oxapentamethylene.

Examples of tetraalkylpiperidine compounds from this class are the compounds of the following formulae:

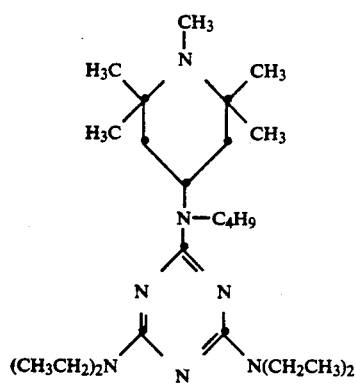
59)
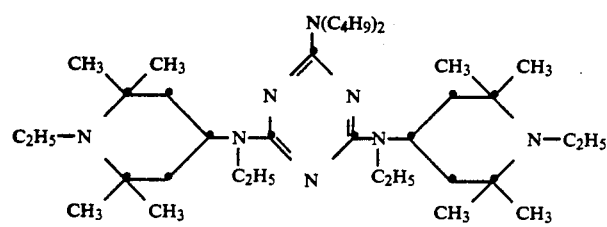
60)
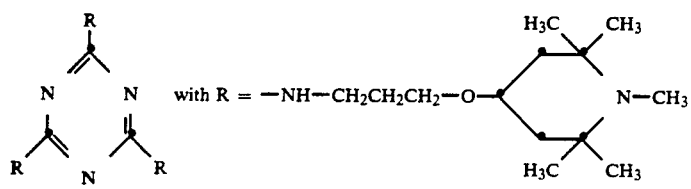
61)
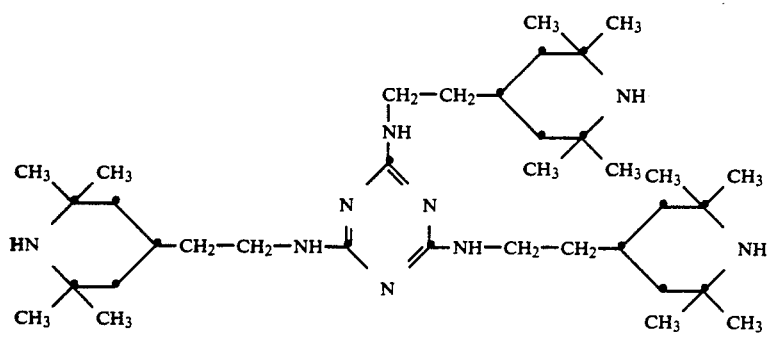
62)
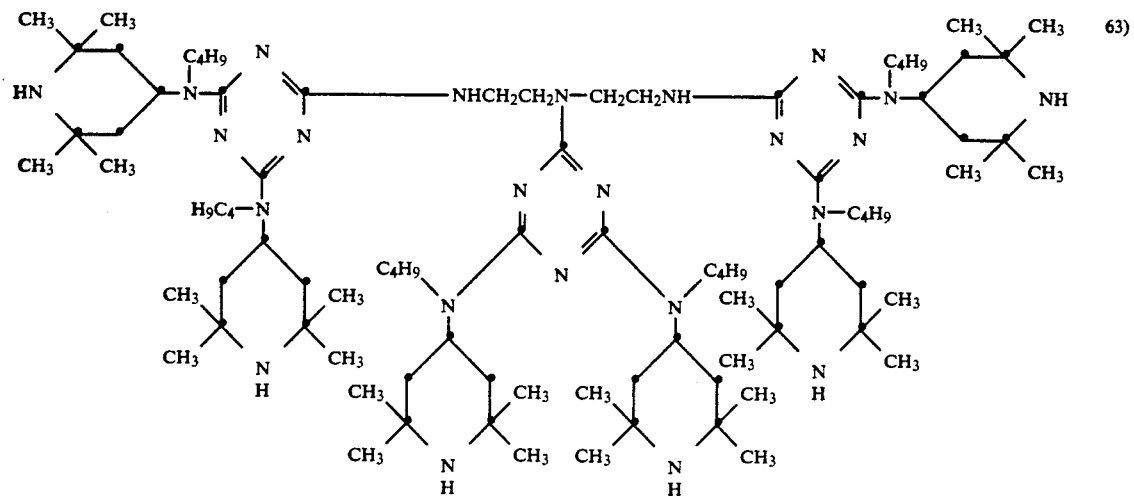
63)

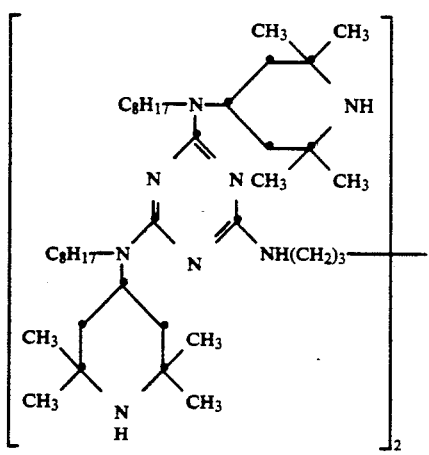
(64)

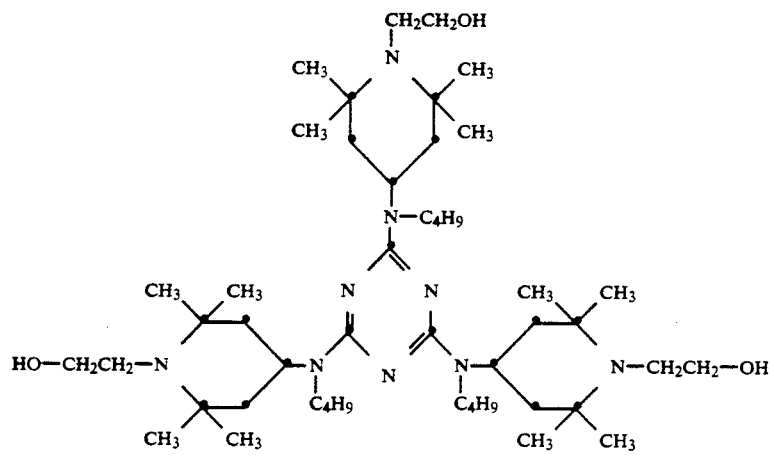
(65)

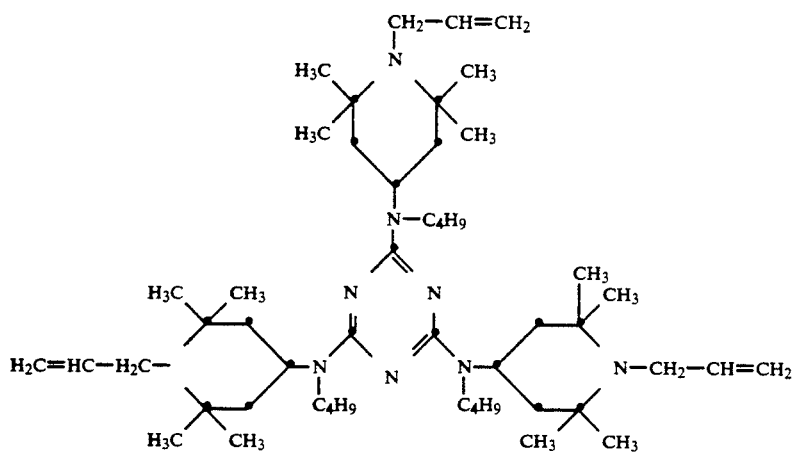
(66)

f) Oligomeric or polymeric compounds, the recurrent structural unit of which contains a 2,2,6,6-tetraalkylpiperidine radical of the formula (I), in particular polyesters, polyethers, polyamides, polyamines, polyurethanes, polyureas, polyaminotriazines, poly(meth)acrylates, poly(meth)acrylamides and copolymers thereof, which contain such radicals.

Examples of 2,2,6,6-tetraalkylpiperidine light stabilizers from this class are the compounds of the following formulae, m being a number from 2 to 200.

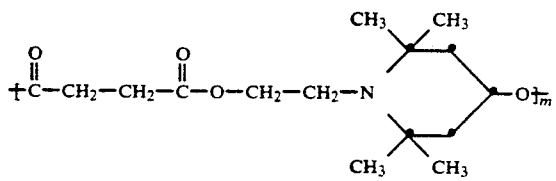
(76)

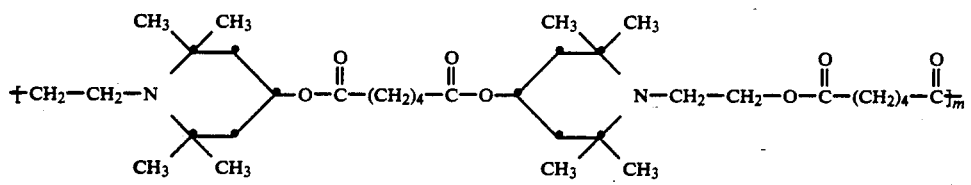
77)
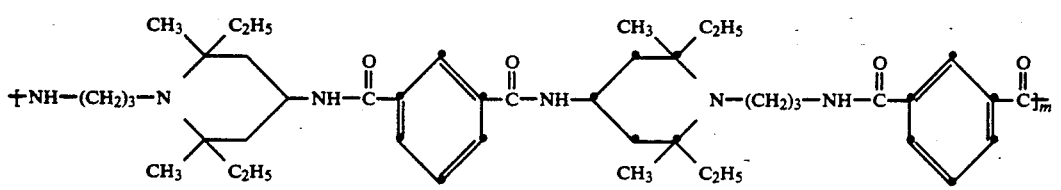
78)
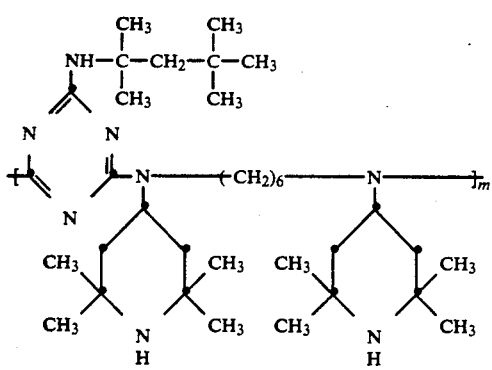
79)
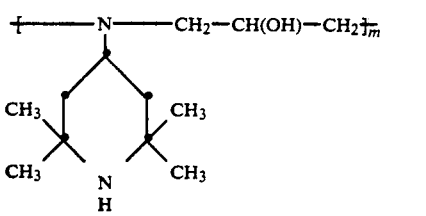
80)
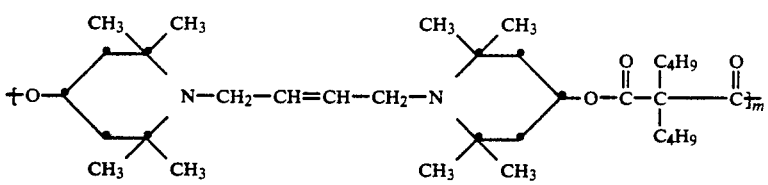
81)
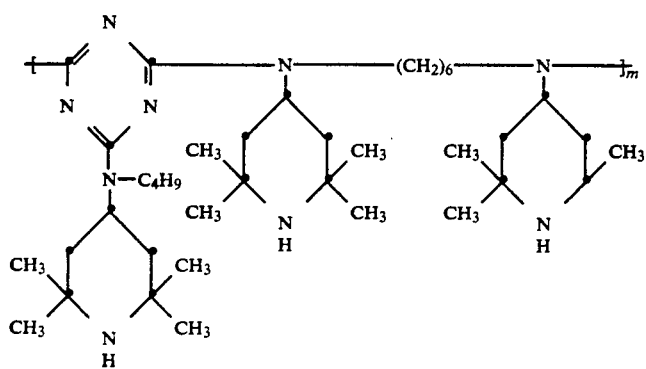
82)

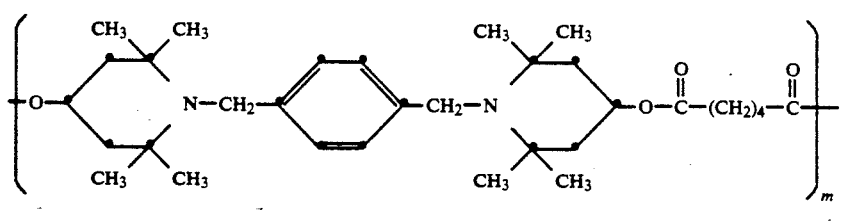
83)
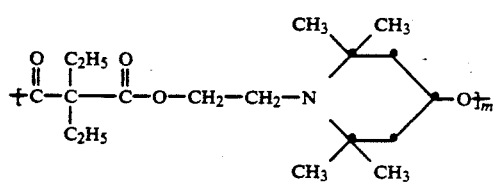
84)
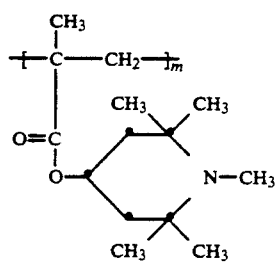
85)
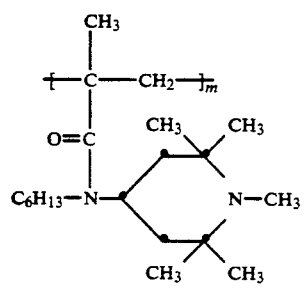
86)
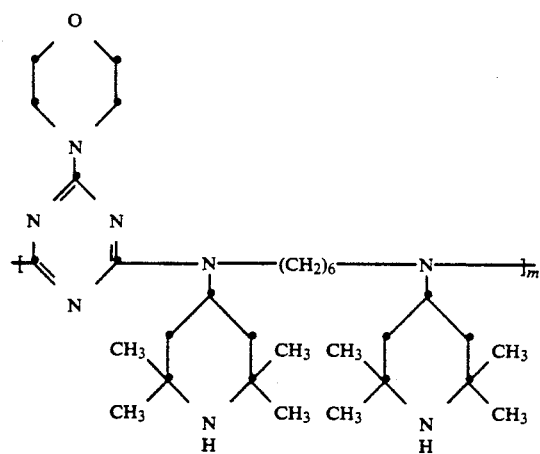
87)
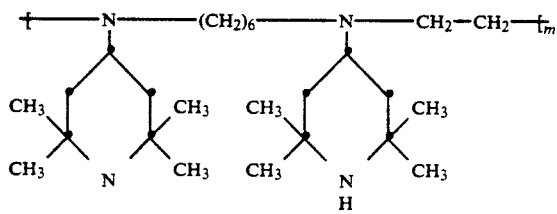
88)

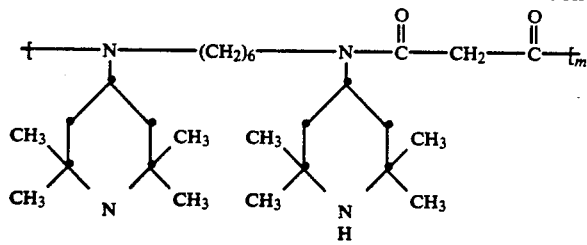

89)

Sterically hindered amines which are particularly preferred with a view to the light stabilization of addition polymer microparticles are those which contain ethylenically unsaturated groups, for example, allyl, vinyl, or maleate groups, and in particular acrylic or methacrylic groups, and which copolymerize with the other monomers. Examples of such compounds are the compound 2, 7, 9, 17 and 49 listed above and also the following compounds: 67) 1,2,2,6,6-pentamethyl-4-acryloyloxypiperidine, 68) 1-acetyl-2,2,6,6-tetramethyl-4-(meth)acryloyloxy-piperidine, 69) 1-benzyl-2,2,6,6-tetramethyl-4-(meth)acryloyloxy-piperidine, 70) 1,2,2,6,6-pentamethyl-4-(meth)acrylamido-piperidine, 71) 1,2,2,6,6-pentamethyl-4-(N-butyl)-acrylamido-piperidine, 72) 1,2,2,6,6-pentamethyl-4-maleimido-piperidine, 73) 1,3,8-triaza-2,4,-dioxo-3-acryloyloxyethyl-7,7,8,9,9-pentamethyl-spiro[4.5]-decane, 74) 1[(2-methacryloyloxy)-ethyl]-2,2,6,6-tetramethylpiperidine, 75) 1,2,2,6,6-pentamethyl-4-vinyloxy-piperidine and 75a) 1,2,2,6,6-pentamethyl-4-methacryloyloxy-piperidine.

In special cases, it can be of advantage to use a mixture of sterically hindered amines.

The light stabilizers from the class of sterically hindered amines are known, for example, from EP-A 114,784 and can be prepared by known processes.

Another group of light stabilizers, which is also important apart from the hindered amine type, are the UV absorbers which belong to various classes of compounds. UV absorbers are also suitable for stabilizing polymer microparticles, according to the invention. The first class of such UV absorbers is represented by the 2-(2-hydroxyphenyl)benzotriazoles, of which the following structural types are particularly suitable for the polymer microparticles according to the invention.

A) Compounds of the formula VII

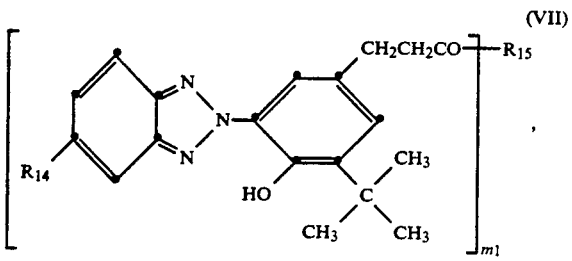

in which $R^{14}$ is H, Cl, $C_1$-$C_4$-alkyl, or $C_1$-$C_4$-alkoxy (preferably H), $m_1$ is one of the numbers 1 or 2 and $R^{15}$ a) in the case of $m_1 = 1$, is

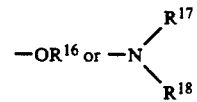

and b) in the case of $m_1 = 2$, is one of the divalent radicals

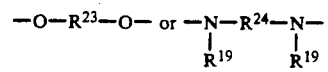

in which $R^{16}$ is H, $C_1$-$C_{18}$-alkyl which is unsubstituted or substituted by 1 to 10 OH groups, unsubstituted or OH-substituted $C_5$-$c_{12}$-cycloalkyl, unsubstituted or OH-substituted straight-chain or branched $C_2$-$C_{18}$-alkenyl, $C_6$-$C_{14}$-aryl, $C_7$-$C_{15}$-alkaryl or $C_7$-$C_{15}$-aralkyl which are unsubstituted or substituted by 1 or 2 OH groups,

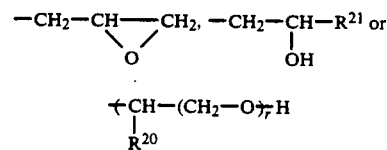

$R^{17}$ and $R^{18}$ independently of one another are H, straight-chain or branched $C_1$-$C_{18}$-alkyl which is unsubstituted or substituted by one or more OH groups, straight-chain or branched $C_3$-$C_{18}$-alkyl which is interrupted once or several times by —O— or —$NR^{19}$—, $C_5$-$C_{12}$-cycloalkyl which is unsubstituted or substituted by one or more OH groups, $C_6$-$C_{14}$-aryl, $C_7$-$C_{15}$-alkaryl or $C_7$-$C_{15}$-aralkyl which are unsubstituted or substituted by one or two OH groups, or straight-chain or branched $C_3$-$C_8$-alkenyl, or $R^{17}$ and $R^{18}$ together with the N atom, to which they are linked, represent a pyrrolidine, piperidine, piperazine or morpholine ring, $R^{19}$ is H or straight-chain or branched $C_1$14 $C_{18}$-alkyl which is unsubstituted or substituted by one or more OH groups, $R^{20}$ is H or methyl and r is an integer from 1 to 10, $R^{21}$ is H, straight-chain or branched $C_1$-$C_{18}$-alkyl, unsubstituted or OH-substituted phenyl, $C_7$-$C_{15}$-aralkyl or $C_7$-$C_{15}$-alkaryl, —$SO_2$—$C_1$-$C_4$-alkyl, —$SO_2$—$C_7$-$C_{18}$-alkaryl, —$SO_2$—$C_6$-$C_{14}$-aryl or —$CH_2$—O—$R^{22}$, $R^{22}$ is straight-chain or branched $C_1$-$C_{18}$-alkyl of $C_3$-$C_{18}$-alkenyl, $C_5$-$C_{12}$-cycloalkyl, $C_6$-$C_{14}$-arcyl, $C_7$-$C_{15}$-aralkyl or $C_7$-$C_{15}$-alkaryl, $R^{23}$ is unsubstituted or OH-substituted $C_2$-$C_{12}$-alkylene or $C_4$-$C_8$-alkenylene, $C_4$-alkynylene, cyclohexylene, straight-chain or branched $C_4$-$C_{18}$-alkylene which is interrupted once or several times by —O—,

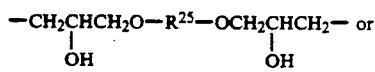

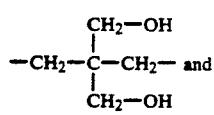

$R^{24}$ is straight-chain or branched $C_2$-$C_{12}$-alkylene which may be interrupted once or several times by —O—, cyclohexylene,

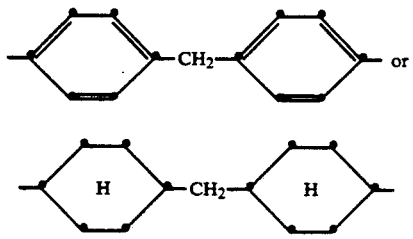

or $R^{24}$ and $R^{19}$ together with two nitrogen atoms are a piperazine ring, $R^{25}$ being straight-chain or branched $C_2$-$C_8$-alkylene, straight-chain or branched $C_4$-$C_{10}$-alkylene which is interrupted once or several times by —O—, 1,3- or 1,4-cyclohexylene, 1,3- or 1,4-phenylene,

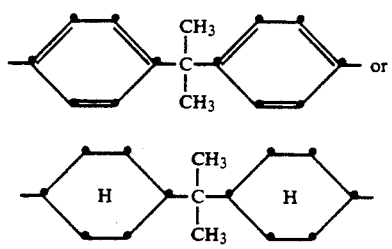

Those compounds of the formula VII should be singled out in which $R^{14}$ is —$OR^{16}$ or —O—$R^{23}$—O— and, amongst these, especially those in which $R^{16}$ is unsubstituted or OH-substituted alkyl or alkenyl, of ($CH_2CH_2O)_{\overline{r}}H$ and $R^{23}$ is unsubstituted or OH-substituted alkylene or alkenylene, or alkylene which is interrupted once or several times by O, for example —$CH_2(CH_2OCH_2)_{r1}CH_2$— with $r_1 = 1$ to 9.

An alkyl radical $R^{14}$ can be, for example, methyl, ethyl, propyl, isopropyl, butyl and tert.-butyl, and an alkoxy radical $R^{14}$ can be, for example, methoxy, ethoxy, propoxy and butoxy.

$R^{16}$, $R^{17}$, $R^{18}$, $R^{19}$, $R^{21}$ and $R^{22}$ can, for example, be the following alkyl radicals: methyl, isopropyl, n-butyl, sec.-butyl, tert.-butyl, tert.-amyl, 2-ethylhexyl, n-octyl, 1,1,3,3-tetramethylbutyl, n-dodecyl, 1,1,7,7-tetramethyloctyl and n-octadecyl.

The radicals $R^{16}$, $R^{17}$, $R^{18}$ and $R^{19}$ are preferably substituted by one or more OH groups.

$R^{17}$ and $R^{18}$ can, for example, be the following $C_3$-$C_{18}$-alkyl radicals which are interrupted by —S—, —O— or —$NR^{19}$— and/or can be substituted by —OH: methoxyethyl, ethoxyethyl, butoxyethyl, butoxypropyl, methylthioethyl, $CH_3OCH_2CH_2OCH_2CH_2$—, $CH_3CH_2OCH_2CH_2OCH_2CH_2$—, $C_4H_9OCH_2CH_2OCH_2CH_2$—, dodecyloxypropyl, 2-hydroxyethyl, 2-hydroxypropyl, 4-hydroxybutyl, 6-hedroxyhexyl,

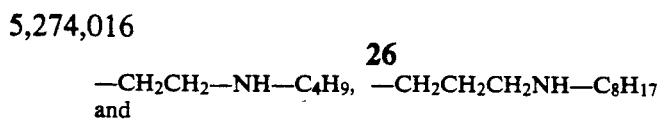

$R^{16}$, $R^{17}$, $R^{18}$ and $R^{22}$ can, for example, be the following $C_5$-$C_{12}$-cycloalkyl radicals: cyclopentyl, cyclohexyl, cyclooctyl or cyclododecyl. In the case of $R^{16}$, $R^{17}$ and $R^{18}$, the cycloalkyl radical can also be OH-substituted, $R^{17}$ and $R^{18}$ can, for example, be the following alkenyl radicals: allyl, methallyl, 2-n-hexenyl and 4-n-octenyl.

An alkenyl radical $R^{16}$ can be as defined for alkenyl radicals $R^{17}$ and $R^{18}$ or it can, for example, be —CH=$CH_2$, 10-n-Undecenyl or 9-n-octadecenyl, and the radical $R^{16}$ can also be OH-substituted.

$R^{16}$, $R^{17}$, $R^{18}$, $R^{21}$ and $R^{22}$ independently of one another can, for example, be the following $C_7$-$C_{15}$-aralkyl radicals: benzyl, α-phenylethyl, β-phenylethyl and 4-tert.-butylbenzyl.

$R^{16}$, $R^{17}$, $R^{18}$ and $R^{22}$ independently of one another can, for example, be the following $C_6$-$C_{14}$-aryl radicals: phenyl, α-naphthyl and β-naphthyl.

$C_7$-$C_{15}$ Alkaryl radicals $R^{16}$, $R^{17}$, $R^{18}$, $R^{21}$ or $R^{22}$ can be tolyl, xylyl, ethylphenyl, isopropylphenyl, n-butylphenyl, tert.-butylphenyl, octylphenyl, di-tert.-butylphenyl or nonylphenyl radical. The radicals can be substituted on the aromatic nucleus or preferably on the alkyl substituent by one or more OH groups.

Alkyl in an —$SO_2$—$C_1$-$C_4$-alkyl radical $R^{21}$ can be a methyl, ethyl, n-propyl, isopropyl or n-, sec.- or tert.-butyl radical.

Aryl in an —$SO_2$—$C_6$-$C_{14}$-aryl radical $R^{21}$ is, for example, phenyl, α-naphthyl or β-naphthyl.

Alkaryl in an —$SO_2$—$C_7$-$C_{18}$-alkaryl radical $R^{21}$ independently is as defined for $R^{16}$.

$C_2$-$C_8$-alkylene radicals $R^{23}$ and $R^{25}$ can, for example, be the following radicals: ethylene, propylene, butylene, hexylene and octylene.

An alkylene radical $R^{24}$ can independently be as defined for $R^{23}$ or, in addition, can also be a higher-molecular groups, such as decylene or dodecylene.

A $C_4$-$C_8$-alkenylene radical $R^{23}$ can, for example, be the following group: butenylene.

Straight-chain or branched $C_4$-$C_{10}$-alkylene groups interrupted by —O— in the case of $R^{23}$ and $R^{25}$ can, for example, be the following groups:

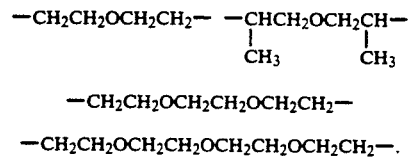

—$CH_2CH_2OCH_2CH_2OCH_2CH_2$—

—$CH_2CH_2OCH_2CH_2OCH_2CH_2OCH_2CH_2$—.

Typical representatives of the compounds of the formula VII in which m is the number 1 are the following: 2-[2-hydroxy-3-tert.-butyl-5-(2-carboxyethyl)-phenyl]-benzotriazole, 2-[2-hydroxy-3-tert.-butyl-5-(2-carboxyethyl)-phenyl]-5-chlorobenzotriazole, 2-[2-hydroxy-3-tert.-butyl-5-(2-carbomethoxyethyl)-phenyl]-benzotriazole, 2-[2-hydroxy-3-tert.-butyl-5-(2-carbomethoxyethyl)-phenyl]-5-chlorobenzotriazole, 2-[2-hydroxy-3-tert.-butyl-5-(2-carbocyclohexyloxyethyl)phenyl]-benzotriazole, 2-[2-hydroxy-3-tert.-butyl-5-(2-carbooc-tyloxyethyl)-phenyl]-benzotriazole, 2-{2-hydroxy-3-tert.-butyl-5-[2-carbo-(2-ethylhexyloxy)-ethyl]-phenyl}-benzotriazole, 2-[2-hydroxy-3-tert.-butyl-5-(2-carbo-iso-decyloxyethyl)-phenyl]-benzotraizole, 2-[2-hydroxy-3-tert.-butyl-5-(2-carbododecyloxyethyl)-phenyl]-benzotriazole, 2-[2-hydroxy-3-tert.-butyl-5-(2-carbododecyloxyethyl)-phenyl]-5-chlorobenzotriazole, 2-[2-hydroxy-3-tert.-butyl-5(2-carbooctyloxyethyl)-phenyl]-5-chlorobenzotriazole, 2-{2-hydroxy-3-tert.-butyl-5-[2-carbo-(2-ethylhexyloxy)-ethyl]-phenyl}-5-chlorobenzotriazole, 2-[2-hydroxy-3-tert.-butyl-5-[2-carbo-)2-hydroxycyclohexyloxy)-ethyl]-ethyl]-phenyl}-benzotriazole, 2-[2-hydroxy-3-tert.-butyl-5-(2-carbopiperidylamidoethyl)-phenyl)-benzotriazole, 2-[2-hydroxy-3-tert.-butyl-5-(2-carbomopholinamidoethyl)-phenyl]-benzotriazole and 2-{2-hydroxy-3-tert.-butyl-5-[2-carbo-(3,5-di-tert.-butyl-4-hydroxyanilido)-ethyl]-phenyl}-benzotriazole.

Typical representatives of compounds of the formula VII in which $m_1$ is the number 2 are the following:

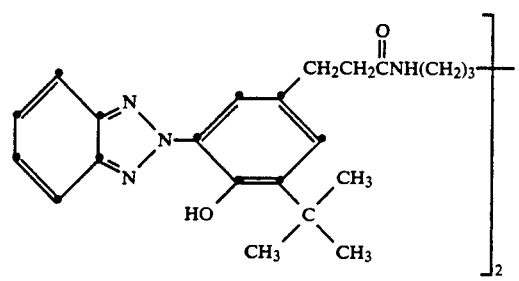

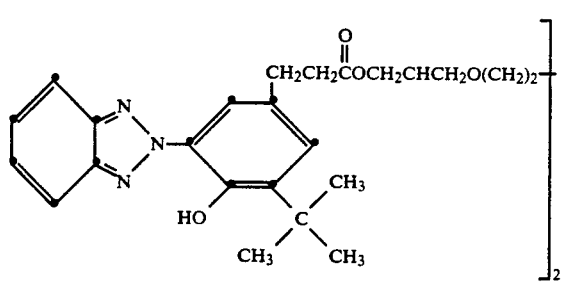

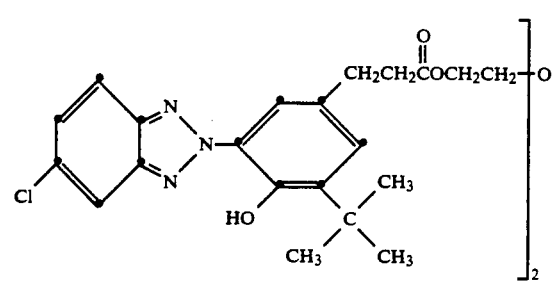

Further preferred compounds of the formula VII are: 2-[2-hydroxy-3-tert.-butyl-5-(2-carbo-n-octyloxyethyl)-phenyl]-benzotriazole, 2-{2-hydroxy-3-tert.-butyl-5-[2-carbo(2-ethylhexyl)-oxyethyl]-phenyl}-benzotriazole, 2-[2-hydroxy-3-tert.-butyl-5-(2-carbo-n-octyloxylethyl)-phenyl]-5-chlorobenzotriazole, 2-{2-hydroxy-3-tert.-butyl-5-[2-carbo-(2-ethylhexyl)-oxyethyl -phenyl}-5-chlorobenzotriazole and the compound of the formula

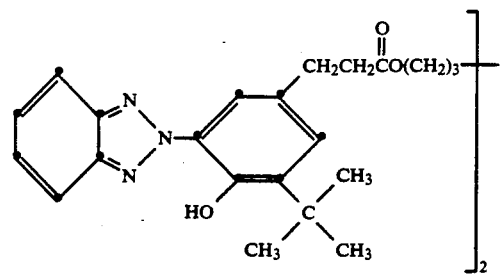

In certain cases, it can be advantageous to use a mixture of two or more compounds of the formula VII. An example is a mixture of 2-[2-hydroxy-3-tert.-butyl-5-(2-carbo-n-octyloxyethyl-phenyl]-5-chlorobenzotriazole and 2-{2-hydroxy-3-tert.-butyl-5-[2-carbo-(2-ethylhexyl)-oxyethyl]-phenyl}-5-chlorobenzotriazole in 1:1 weight ratio.

B) Compounds of the formula VIII

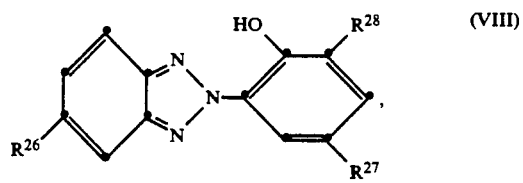

in which $R^{26}$ is H, chlorine or carboxy, $R^{27}$ is straight-chain or branched, substituted or unsubstituted $C_1-C_{18}$-alkyl, $C_7-C_{15}$-aralkyl, $C_2-C_3$-alkenyl or the group

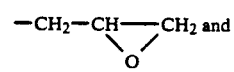

$R^{28}$ is H or independently is as defined for $R^{27}$.

Substituted or unsubstituted $C_1-C_{18}$-alkyl radicals $R^{27}$ and $R^{28}$ can here independently of one another be as defined above for $R^{16}$. Other possible substituents are carboxyl groups. Preferably, the alkyl substituents are substituted by at least one hydroxyl or carboxyl group.

$C_7-C_{15}$-aralkyl radicals $R^{27}$ and $R^{28}$ can independently of one another be, for example, benzyl, α-phenylethyl, β-phenylethyl, α,α-dimethylbenzyl or 4-tert.-butylbenzyl.

Examples of suitable compounds of the formula VII are

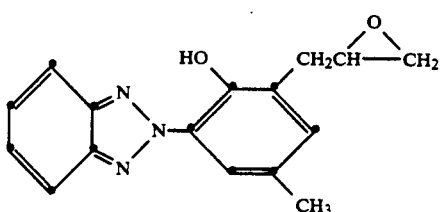

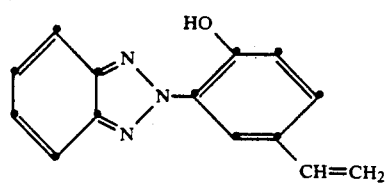

C) Compounds of the formula IX

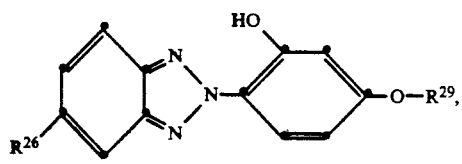
(IX)

in which $R^{26}$ is as defined above and $R^{29}$ is straight-chain or branched $C_1-C_{18}$-alkyl which is unsubstituted or substituted by one or more OH, carboxyl or epoxy groups and which can be interrupted once or several times by —O—,

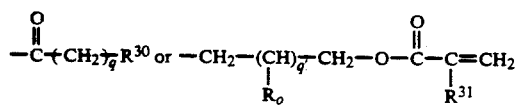

q is an integer from 1 to 12, $R^{30}$ is carboxyl or

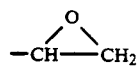

$R^{31}$ is hydrogen or methyl, $R_o$ is hydrogen or hydroxyl and q' is 0 or 1.

A substituted $C_1-C_{18}$-alkyl radical $R^{29}$ is here preferably substituted by 1 to 3 OH, carboxyl or epoxy groups and particularly preferably by one OH, carboxy or epoxy group.

A $C_1-C_{18}$-alkyl radical $R^{29}$ interrupted by —O— can, for example, have the following structure

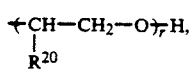

in which r and $R^{20}$ are as defined above.

Examples of suitable light stabilizers of the formula IX are:

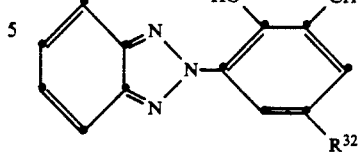
(X)

in which $R^{31}$ is as defined above and $R^{32}$ is hydrogen or straight-chain or branched $C_1-C_{18}$-alkyl which is unsubstituted or is monosubstituted or polysubstituted by —OH.

A $C_1-C_{18}$-alkyl radical $R^{32}$ can here be as defined above for $R^{16}$ and preferably is unsubstituted $C_1-C_{12}$-alkyl. Examples of 2-(2-hydroxyphenyl)-benzotriazoles of this structural type are:

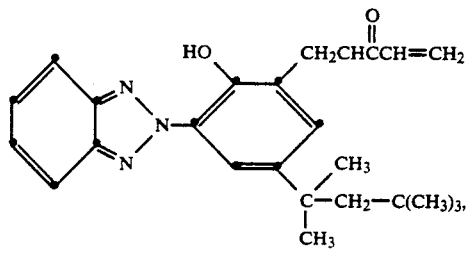

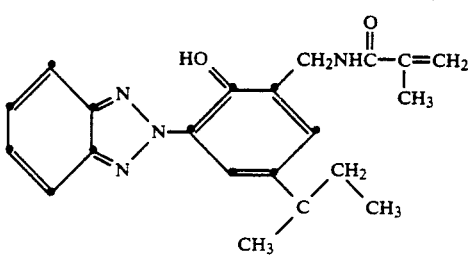

E) Compounds of the formula XI

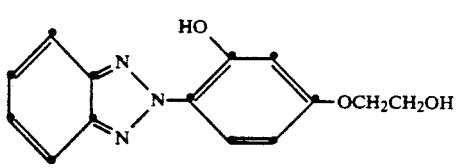

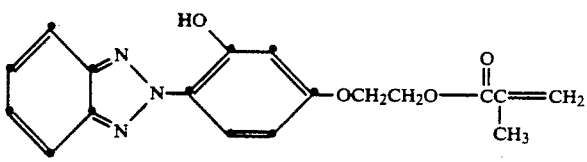

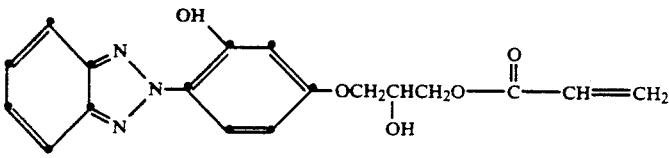

D) Compounds of the formula X

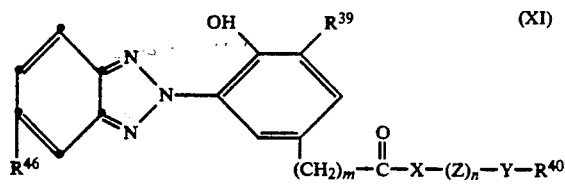

in which

X is —O— or —N($R^{41}$)—, Y is —O— or —N($R^{42}$)—, Z is $C_2$-$C_{12}$-alkylene, $C_4$-$C_{12}$-alkylene which is interrupted by one to three —N($R^{47}$)— groups and/or oxygen atoms, $C_3$-$C_{12}$-alkylene substituted by a hydroxyl group, butenylene, butynylene, cyclohexylene or phenylene, m is the number 0, 1 or 2, n is 1 or, if X and Y are —N($R^{41}$)— or —N($R^{42}$)— respectively, is 0, $R^{46}$ is hydrogen, chlorine, $C_1$-$C_4$-alkyl or $C_1$-$C_4$-alkoxy (preferably hydrogen), $R^{39}$ is hydrogen or $C_1$-$C_8$-alkyl, $R^{40}$ is a group —C(O)—C($R^{43}$)=C(H)$R^{44}$ or, if Y is —N($R^{42}$)—, forms together with $R^{42}$ a group —C(O)—CH=CH—(O)—, $R^{43}$ being hydrogen or methyl and $R^{44}$ being hydrogen, methyl or —C(O)—X—$R^{45}$, $R^{45}$ being hydrogen, $C_1$-$C_{12}$-alkyl or a group of the formula

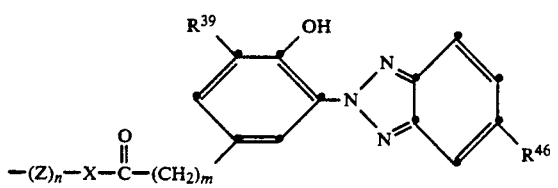

wherein the symbols $R^{46}$, $R^{39}$, X, Z, m and n are as defined above, and $R^{41}$, $R^{42}$ and $R^{47}$ independently of one another are hydrogen, $C_1$-$C_{12}$-alkyl, $C_3$-$C_{12}$-alkyl interrupted by 1 to 3 oxygen atoms, cyclohexyl or $C_7$-$CH_{11}$-aralkyl, and $R^{41}$ together with $R^{42}$, if Z is ethylene, can also form ethylene.

Examples of benzotriazoles of the formula XI are: 2(acrylyloxy)-cyclohexyl 3-(2H-benzotriazol-2-yl)-4-hydroxy-5-tert.butyl-benzenepropanoate, 2-(acrylyloxy)-cyclohexyl 3(5-chloro-2H-benzotriazol-2-yl)-4-hydroxy-5-tert.butylbenzenepropanoate, N-(2-acrylyloxyethyl)-3-(2H-benzotriazol-2-yl)-4-hydroxy-5-tert.butyl-benzenepropanamide, N-(2-acrylyloxyethyl)-3-(5-chloro-2H-benzotriazol-2-yl)-4-hydroxy-5-tert.butyl-benzenepropanamide, N-(3-acrylyloxypropyl)-3-(2H-benzotriazol-2-yl)-4-hydroxy-5-tert.butyl-benzenepropanamide, 2-(acrylyloxy)-propyl 3-(2H-benzotriazol-2-yl)-4-hydroxy-5-tert.butyl-benzenepropanoate, 2-(acrylyloxy)-butyl 3-(2H-benzotriazol-2-yl)-4-hydroxy-5-tert.butyl-benzenepropanoate, 2-acrylyl-2-phenyl-ethyl 3-(2H-benzotriazol-2yl)-4-hydroxy-5-tert.butyl-benzenepropanoate, 2-acrylyl-3-phenoxy-propyl 3-(2H-benzotriazol-2-yl)-4-hydroxy-5-tert.butyl-benzenepropanoate, and N-(2(4-methoxy-1,4-dioxo-cisbut-2-en-1-yloxy)-ethyl-3-(2H-benzotriazol-2-yl)-4-hydroxy-5-tert.butyl-benzenepropanamide.

F) Compounds of the formula XII

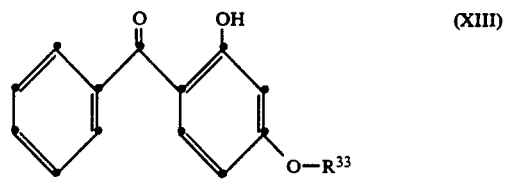

in which $R^{48}$ is substituted or unsubstituted $C_1$-$C_{18}$-alkyl, $C_7$-$C_{15}$-aralkyl or $C_2$-$C_3$-alkenyl.

A substituted or unsubstituted alkyl radical $R^{48}$ can here be, for example, as defined above for $R^{16}$. Further possible substituents are carboxyl groups. A substituted alkyl radical $R^{48}$ is then preferably substituted by 1 to 3 hydroxyl groups or/and 1 carboxyl group. However, the alkyl radical $R^{48}$ is preferably unsubstituted.

The 2-(2-hydroxyphenyl)-benzotriazoles which can be used as light stabilizers for the microparticles are known or can be prepared by methods known per se, for example according to EP-A 57,160.

A further type of suitable light stabilizers from the UV absorber group is represented by 2-hydroxybenzophenones which have, for example, a structure according to the formula XIII

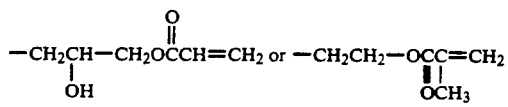

in which $R^{33}$ is hydrogen or straight-chain or branched $C_1$-$C_{18}$-alkyl which may be interrupted once or several times by —O— and preferably is substituted by at least one hydroxyl, carboxyl or epoxy group, or is $$-CH_2CH-CH_2OCCH=CH_2 \text{ or } -CH_2CH_2-OCC=CH_2$$
$$\phantom{-CH_2C}|\phantom{H-CH_2OCCH=CH_2 \text{ or } -CH_2CH_2-O}||$$
$$\phantom{-CH_2CH-CH_2O}OH\phantom{CCH=CH_2 \text{ or } -CH_2CH_2-OCC}OCH_3$$

Examples of suitable 2-hydroxybenzophenones are the 4-hydroxy, 4-methoxy, 4-octyloxy, 4-decyloxy, or 4-dodecyloxy derivatives, and these may be substituted by 1 to 3, preferably 1, hydroxyl, carboxyl or epoxy groups.

Further classes of suitable UV absorbers comprise 2,4-bis-(2'-hydroxyphenyl)-6-alkyl-s-triazines, for example the 6-ethyl, 6-heptadecyl or 6-undecyl derivatives, and oxalic acid diamides, in particular oxalic acid dianilides, for example 4,4'-di-octyloxy-oxanilide, 2,2'-octyloxy-5,5'-di-tert.butyl-oxanilide, 2,2'-didodecyloxy-5,5'-di-tert.butyl-oxanilide, 2-ethoxy-2-'-ethyl-oxanilide, N,N'-bis-(3-dimethylaminopropyl)-oxalamide, 2-ethoxy-5-tert.butyl-2'-ethyl-oxaniliade and its mixture with 2-ethoxy-2'-ethyl-5,4'-di-tert.butyl-oxanilide and mixtures of o- and p-methoxy- and o- and p-ethoxy-di-substituted oxanilides.

Other possible light stabilizers for the microparticles are cinnamic acid derivatives of the formula XIV

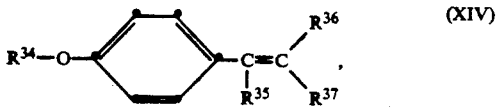

(XIV)

in which $R^{34}$ is hydrogen or straight-chain or branched $C_1$-$C_{18}$-alkyl which may be interrupted by —O—, $R^{35}$ is hydrogen, $C_1$-$C_4$-alkyl, methoxy or phenyl, $R^{36}$ and $R^{37}$ independently of one another are carboxyl, cyano or —C(O)O$R^{38}$ groups and $R^{38}$ is straight-chain or branched $C_1$-$C_{18}$-alkyl which may be interrupted by —O—. Examples of suitable cinnamic acid derivatives are ethyl and isooctyl α-cyano-β,β-diphenylacrylate, methyl α-carbomethoxycinnamate and methyl α-cyano-β-methoxy-cinnamate.

As already mentioned above, those light stabilizers are preferred which can be chemically anchored in, that is to say copolymerized into, the polymer microparticles according to the invention. Generally this is the case with light stabilizers, in particular those from the classes defined above, which contain reactive substituents which can participate in the polymerization reaction under the preparation conditions. Such substituents are especially those which contain ethylenic double bonds (especially when they are used in polymer microparticles which are to be prepared by polyaddition, for example acrylates) or carboxyl, hydroxyl and epoxy groups. The three last-mentioned groups are important especially when used for microparticles which are to be prepared by polycondensation (for example polyesters). Those light stabilizers can also be bonded chemically, at least partially, which contain groups from which reactive groups are formed under the polymerization conditions. Examples of these are ester groups, and composite substituents which contain ester groups.

In the case of the hindered amine light stabilizers, those are especially preferred which carry radicals containing hydroxyl groups or ethylenic double bonds. Amongst the UV absorbers, those are preferred which have groups containing hydroxyl, carboxyl or epoxy groups or ethylenic double bonds.

In general, 2,2,6,6-tetraalkylpiperidine derivatives (in particular those listed in the above sections a) to f) and 2-(2-hydroxyphenyl)-benzotriazoles (in particular those listed in the above sections A) to E)) are preferably employed as light stabilizers. The compounds of the formulae II, III, IV, VA-VC and VI (especially those of the formulae II, II, VA and vI) and those of the formulae VIII, IX, X and XI are here to be mentioned in particular.

The present invention also relates to a process for the preparation of light-stabilized polymer microparticles, having a particle size distribution of 0.01-20 μm, which comprises polymerizing one or several different ethylenically mono- or poly-unsaturated monomeric compounds or/and one or several different monomers from the group comprising polyalcohols, polycarboxylic acids, hydroxy carboxylic acids, lactones, aminocarboxylic acids, aminoalcohols and polyamines in a manner known per se in the presence of 0.1 to 30% by weight, relative to the monomers, of one or more light stabilizer(s) in such a way that at least a part of the polymer obtained is crosslinked. The polymerization can here take place in one or several steps, at least one step being carried out in the presence of the light stabilizer(s).

The monomers used are particularly advantageously (i) acrylic acid and methacrylic acid and derivatives thereof, for example their esters, in particular the methyl or ethyl esters. Advantageously, monomer mixtures are employed) copolymers. In this way, for example, polyacrylate microparticles are obtained; and (ii) polyalcohols, polycarboxylic acids and hydroxycarboxylic acids, which give polyester microparticles. Mixtures of both types are also possible, if monomers are employed which have functionalities for both addition polymerization and condensation polymerization. Examples of monomers to be used have been given above.

It is particularly advantageous to produce microparticles which contain parts effecting improved dispersibility of the particles. These parts can, for example, consist of an amphipathic dispersant which is an essentially linear to branched polymer polymerized onto the polymer microparticle core.

The process according to the invention is therefore carried out, for example, by a) polymerizing one or several different ethylenically mono- or poly-unsaturated monomeric compound or-/and one or several different monomers from the group comprising polyalcohols, polycarboxylic acids, hydroxycarboxylic acids, lactones, aminocarboxylic acids, aminoalcohols and polyamines with crosslinking, b) polymerizing one or more of the monomers indicated under a) to give an essentially linear to branched polymer and c) polymerizing (grafting) the polymer obtained according to b) onto the polymer obtained according to a), the polyermization according to a) or according to b) or both polymerizations being carried out in the presence of one or more light stabilizers, and it being possible for the light stabilizers in the two polymerization steps to be identical or different and the total quantity of light stabilizer being 0.1 to 30% by weight, relative to the monomers in both polymerization steps, and it being possible for the polymerization a) to be carried out wholly or partially in the presence of the polymer formed according to b).

The monomers which can be used in step b) are in principle those which are also employed for step a). However, they must be selected such that no crosslinking occurs during the polymerization. The linear to branched polymers obtained according to step b) ("amphipathic dispersants") are preferably copolymers which are grafted in the conventional manner onto the crosslinked polymers obtained according to a) ("core"). Microparticles with a particularly good light stabilization are obtained when the addition of the light stabilizer is made to the polymerization step b) or to both step b) and step a).

The polymerization itself can be carried out in a manner known per se, for example according to EP-A 3,166, EP-A 119,051, U.S. Pat. No. 4,290,932, DE-A 2,818,102 or GB-A 1,156,012 and according to the literature references given in these.

Light-stabilized addition polymer microparticles can be obtained, for example, according to EP-A 119,051 or U.S. Pat. No. 4,290,932 by emulsion polymerization, by polymerizing a suitable selection of ethylenically unsaturated monomers in water in the presence of a quantity, defined below, of one or more light stabilizer(s). Subsequently, the water can be removed, for example, by azeotropic distillation.

The preparation of the microparticles according to the invention by a dispersion polymerization process, for example as disclosed in EP-A 3,166 or GB-A 1,156,012, is preferred.

In this case, for example, a selection of suitable monomers is polymerized in the presence of a quantity, defined below, of one or more light stabilizer(s) in an organic solvent in which the light stabilizer(s) and the monomers are soluble as far as possible, but the copolymer formed is insoluble. It may happen that the light stabilizer(s) used or the monomers, on which the condensation polymer microparticles are based, are only slightly soluble in the liquid in which the polymerization is to be carried out. In this case, the first stage of the dispersion polymerization comprises bringing the light stabilizer or the monomers concerned by means of a dispersant into the state of a colloidal dispersion in the inert liquid.

The preparation of the light-stabilized polymer microparticles according to EP-A 3,166 is particularly preferred, wherein the particle formation is preceded by the preparation of an amphipathic dispersant, which contains a component which is solvated by the organic liquid present and, in addition, contains a further component, by means of which it can be anchored to the polymer microparticles (step b) above). Suitable monomers are then polymerized advantageously in the presence of an inert diluent and of the amphipathic dispersant prepared in situ, it being possible for the latter to be added before, during or after the polymerization according to step a). If desired, the microparticles can then be separated from the resulting dispersion for example by spray-drying or freeze-drying. The anchorage of the amphipathic dispersant to the polymer microparticles can be of a physical or chemical nature, chemical bonding of the dispersant to the microparticles being preferred. Suitable amphipathic dispersants and their preparation are described, for example, in EP-A 3,166.

The light stabilizer(s) is or are added to the monomer mixture, which is to be polymerized, in a quantity from 0.1 to 30% by weight and preferably 0.5 to 10.0% by weight, each relative to the monomers. The addition can be made at the start, together with the monomers, continuously during or towards the end of the polymerization/polycondensation process. In this way, uniform distribution of the light stabilizer(s) in the microparticles or enrichment in the outer layers is achieved. This ensures that the light stabilizer(s) is or are physically or chemically anchored in the resulting polymer microparticles depending on its (their) nature. Preferably, the light stabilizer carries reactive groups, for example hydroxyl, carboxyl, ester, epoxy, isocyanate, amino or amide groups or ethylenic double bonds, for example in (meth)acrylate or vinyl groups, by means of which it can be chemically bonded to the polymer and, if appropriate, can participate directly in the polymerization.

The invention also relates to dispersions which contain the polymer microparticles according to the invention. For practical purposes, the microparticles are not isolated as such but processed further as a dispersion in the solvent in which the polymerization took place. The dispersion media used can, in particular, be aromatic, aliphatic and cycloaliphatic hydrocarbons, but other, for example water, are also possible. Examples of hydrocarbons are benzene, toluene and especially higher-boiling aliphatic hydrocarbon fractions, for example those having a boiling range of 100°–200° C. The dispersions according to the invention contain the microparticles, for example, in a quantity from 10 to 90%, in particular 20 to 80%, for example 40 to 80%, relative to the dispersion.

The invention also relates to a coating composition wherein the film-forming material comprises a) 30 to 95% by volume of a disperse phase which contains microparticles according to the invention and b) 70 to 5% by volume of a liquid continuous phase which has a viscosity of 0.1 to 30 Poise at room temperature and is capable of curing a film-forming polymer, the total volume of a) and b) being 100% and the disperse phase participating in curing the coating. Phase b) can here also contain one or more light stabilizers. The disperse phase contains preferably at least 50% by volume of microparticles.

Those coating compositions are preferred in which the film-forming material comprises 30 to 85% by volume of the disperse phase which contains at least 50% by volume of microparticles according to the invention, and 70–15% by volume of the liquid continuous phase which has a viscosity of 0.1 to 20 Poise at room temperature.

The basis structure of such coating compositions is shown, for example, in EP-A 3,166, EP-A 119,051, U.S. Pat. No. 4,290,932, DE-A 2,8181,102 or GB-A 1,1,56,012. The particles of the disperse phase have a size or size distribution in the range of 0.1 to 20 $\mu$m.

The disperse phase can consist exclusively of polymer microparticles; however, in addition to the microparticles and, if appropriate, solvent, the disperse phase preferably also contains particles of pigment, filler and/or extender, such as are conventionally used in coating compositions. With advantage, these particles have a size of, for example, 0.1 to 5 $\mu$m, as is conventional in coating technology.

The polymer microparticles and the pigment, filler and/or extender particles are advantageously in a stable dispersion in a deflocculated state in the liquid continuous phase; this can be accomplished, for example, by means of known pigment dispersants. Alternatively, the liquid film-forming material in the continuous phase or a chemical variant thereof can itself be an effective dispersant.

The dispersing of the pigment can be carried out in the manner customary in coating technology, for example with the use of ball mills, bead mills, attrition mills or colloid mills.

As already mentioned, it is preferred to prepare the light-stabilized microparticles according to the invention in accordance with EP-A 3,166 in an inert liquid and in the presence of an amphipathic dispersant, a stable dispersion of the polymer microparticles being formed. Pigment, filler and/or extender particles in this dispersion can likewise be stabilized by radicals of the amphipathic dispersant. The disperse phase obtained in this way can then be combined with the continuous phase to form a coating composition. For further details on this point, reference may be made to EP-A 3,166.

The disperse phase is capable of participating in the curing of the coating, presupposing that either the microparticle core or the dispersant part or both have chemically reactive groups, by means of which they can participate in a condensation polymerization reaction. Light-stabilized microparticles, containing reactive groups capable of condensation polymerization, and their preparation have already been described above. If the capability of participating in the curing reaction resides in the dispersant part, the latter contains appropriate reactive groups, for example hydroxyl or carboxyl groups, which can be located in the solvated polymer part or in that part of the molecule which serves as an anchoring component for the microparticles.

As a result of the conditions described in the preceding paragraph, the disperse phase/continuous phase system can also itself form a two-component system, that is to say the film formation is accomplished by a reaction of the two phases with one another. In an example of such a case, the disperse phase contains polyester microparticles with reactive groups and the continuous phase contains, for example, an isocyanate resin. The result is then a polyurethane film.

An example of a corresponding amphipathic dispersant is a graft copolymer which is obtainable by copolymerization of methyl methacrylate, methacrylic acid and the glycidyl methacrylate adduct of the copolyester from 12-hydroxystearic acid and dimethylolpropionic acid. Further examples of suitable dispersants are given in EP-A 3,166.

The other component of the coating compositions according to the invention is the liquid continuous phase, which is capable of giving a polymer film when cured by means of addition or condensation polymerization.

Condensation polymerization is here to be understood as meaning in particular the polymerization by means of a reaction of pairs of functional groups with the formation of functional units, which are not present in the monomers, in which case the reaction can, if appropriate, be connected with the evolution of low-molecular by-products (see EP-A 3,166).

Suitable constituents of the continuous phase are in particular curable or thermosetting resins which can be converted into film-forming polymer by means of heating and/or addition of a catalyst. Examples of such resins are:

1. Phenol/formaldehyde resins, i.e. the product of the reaction of phenols with formaldehyde.
2. Amino/formaldehyde resins, for example urea/formaldehyde or melamine/formaldehyde resins, obtainable by reacting urea, melamine or other nitrogen-containing compounds with formaldehyde.
3. Crosslinkable acrylic resins which are derived from substitituted acrylates, for example epoxy-acrylates, urethane-acrylates or polyester-acrylates, and also acrylic resins which do not contain any olefinic double bond and the OH or/and COOH groups of which can participate in the condensation reaction.
4. Polyester resins and alkyd resins.
5. Polyurethane resins based on the reaction of diisocyanates or polyisocyanates with polyhydroxy compounds.
6. Epoxide resins, for example those obtained by reacting epichlorohydrin with bisphenol A.

The continuous phase can, in principle, consist of a single liquid substance or of a homogeneous liquid mixture of two or more substances.

A mixture of two or more substances is preferred, and this can be in the form of a one-component or two-component system.

If the continuous liquid phase is a one-component system, this contains the film-forming constituents in a storage-stable form, and curing can take place, for example, by mere heating, or a curing agent is added.

Suitable one-component systems are built up, for example, from one of the said therosmetting resins and, if appropriate, a further liquid substance, the so-called reactive diluent, which contains reactive groups, by means of which it can participate in the curing of the film-forming material and which especially contributes to improved flexibility of the coat film. The reactive diluent is, for example, a bifunctional monomer or oligomer having molecular weights up to about 1000 and containing, in particular, OH groups, for example 2–6 OH groups. Examples of these are simple glycols or polyols such as butane-1,4-diol, and especially hydroxy-terminated oligomeric esters of polyalcohols with polycarboxylic acids and/or monocarboxylic acids. Examples of suitable reactive diluents are given in EP-A 3,166.

If the continuous liquid phase is a two-component system, this is prepared only just before application of the finished coating composition, by combining two liquid components which are mutually reactive and, in addition, are capable of forming a film.

In this case, the second component can co-react with the first component and thus form a cured film, as is the case, for example, with two-component polyurethane coatings. However, the second component can also be a catalyst for the curing reaction of the first component, the acid-catalyzed curing of amino resins being an example.

Those coating compositions are preferred according to the invention which are based on a crosslinkable acrylate, polyester/alkyd or polyurethane resin which, if appropriate, has been crosslinked with aminoplasts, polyisocyanate or polyepoxides.

As a special case, the two-component system of a disperse and a continuous phase, as listed above, may be mentioned here, wherein the coating film is formed by reaction of the two phases with one another, for example the preparation of a polyurethane film by reaction of a disperse phase, which contains polyester microparticles with reactive groups, with a continuous phase containing an isocyanate resin.

The coating compositions according to the invention can, in the continuous phase, contain a catalyst for curing the coating, which catalyst is added, depending on the nature of the film-forming material used, preferably in a quantity from 0.1 to 15% by weight, relative to the total continuous phase including any reactive diluent present.

If the continuous phase consists mainly of thermosetting resins, the catalyst is preferably an acidic catalyst or a catalyst which releases acid on heating, for example methanesulfonic acid, touenesulfonic acid, phosphoric acid, half-esters of maleic acid, cyclohexylphosphonous acid, trichloroacetic acid, trifluoroacetic acid or a tetrahalogenophthalic acid and half-esters thereof.

In addition to the film-forming components, namely the disperse phase and the liquid continuous phase, the coating compositions according to the invention can contain an inert liquid diluent, for example in a quantity of up to 50 in particular 30% by volume, which volatilizes under the conditions of the application of the coating composition to a substrate. Examples of suitable inert solvents are aromatic and aliphatic hydrocarbons, halogenated hydrocarbons, lower alcohols or water.

It can be desirable to add further substances to the coating composition, which affect certain properties, for example the flow behaviour or the adhesion to a substrate. Such additives, which are in general added to the continuous phase, are known to those skilled in the art.

Preferably, the film-forming material in the coating compositions according to the invention consists of 40 to 80% by volume of disperse phase and 60 to 20% by volume of liquid continuous phase.

The coating compositions according to the invention can be applied to a substrate by means of any conventional method, known to those skilled in the art, for example by brushing, spraying or dipping. The coatings and finishes based on the compositions according to the invention are dried after application and baked.

The coating compositions according to the invention are suitable for use in any types of industrial painting, for example for painting machines, vehicles, ships or structural components. It is of particular importance for vehicle painting. This may be either one-coat or two-coat painting.

Coatings and finishes based on the coating composition according to the invention are distinguished by improved weathering resistance, and especially by a very high light stability.

Moreover, the invention relates to the use of light-stabilized microparticles according to the invention as constituents of coating compositions.

In the dispersion which is obtained in the process according to the invention and which contains the polymer microparticles according to the invention, there are also, in addition to the actual microparticles which meet the required specifications (size distribution 0.01-20 μm and crosslinking), proportions of other polymers which are not microparticles in the above sense. These do not interfere with the use in coating compositions, so that the dispersions obtained can as a rule be employed directly. If required, however, the microparticles can also be isolated as such or purified by removal of other polymers present. The latter can be accomplished, for example, by reprecipitation in suitable solvents, in which the uncrosslinked proportions are soluble. This gives purified microparticle dispersions, from which the particles themselves can be isolated by suitable methods known per se, for example by spray-drying and especially by freezing-drying. The isolated microparticles can then likewise be characterized by methods conventional in polymer chemistry, for example by means of light-scattering measurements, scanning electron microscopy, a determination of the size distribution, of the form, and the like. As already mentioned before, the microparticles have, in the ideal case, a spherical to egg-like shape. The isolation and characterization of polymer microparticles have been described in many literature references, for example by Funke et al., Progr. Colloid Polymer Sci. 57, 48-53 (1975).

The examples which follow serve for further explanation of the various aspects of the present invention, but they do not represent any restriction whatsoever of the generally applicable principle of the present invention. In the examples, like everywhere else in the description, parts and percentages are by weight, unless otherwise stated. In preparation examples 1 to 18, the isolation of the microparticles as such is not mentioned, for the sake of simplicity. This is carried out in the manner explicitly described above.

EXAMPLE 1a

A. A Preparation of an Amphipathic Dispersant

I. Preparation of a 12-hydroxystearic acid/dimethylolpropionic acid copolyester 1350 g of 12-hydroxystearic acid and 100.5 g of 2,2-bis-(hydroxymethyl)-propionic acid as well as 145 g of an alkane mixture (180°-220° C.) and 3 g of methanesulfonic acid as a catalyst are put into a 2.5 liter sulfonation flask fitted with stirrer, water separator and nitrogen inlet. The reaction mixture is then heated to 156° C., about 78 g of $H_2O$ being separated out in the course of 6 hours (solution $A_1$).

II. Preparation of a glycidyl methacrylate adduct of I 500 g of the solution $A_1$ thus obtained are heated for six hours under reflux with 46.5 g of glycidyl methacrylate, 1.5 g of dimethylaminododecane, 0.5 g of hydroquinone and 20 g of alkane mixture (180°-220° C.) in a 1.5 liter sulfonation flask fitted with $N_2$ inlet and reflux condenser (solution $B_1$).

III. Copolymerization 375 g of methyl ethyl ketone are put into a 1.5 liter sulfonation flask with reflux condenser and $N_2$ inlet and are heated to reflux (80° C.). In the course of 2 hours, the following mixture is added dropwise:

213.5 g of solution $B_1$ (obtained according to II)
184 g of methyl methacrylate
20.5 g of methacrylic acid
10.4 g of 4-acryloyloxy-1,2,2,6,6-pentamethylpiperidine
2.15 g of azodiisobutyronitrile and
2.15 g of n-octylmercaptan.

After the dropwise addition of the solution has been completed, a further 0.3 g of azodiisobutyronitrile is added and the solution is boiled under reflux for a further 2 hours. The solution is then diluted with 580 g of ®Solvesso 100 (alkane mixture: boiling range 162°-177° C.) and about 40 g of solvent mixture are distilled off. This gives a solution having a solids content of about 30%. The content of light stabilizer (4-acryloyloxy-1,2,2,6,6-pentamethylpiperidine) is about 2.5%, relative to the solids content (=solution $C_1$).

B. Preparation of a Light-Stabilized Polyester Microparticle Dispersion 156 g of iosphthalic acid,
75.5 g of trimethylolpropane,
117 g of neopentyl glycol and
1 g of tetrabutyl orthotitanate
are put into a 1.5 liter sulfonation flask fitted with a turbine stirrer, water separator and $N_2$ blanketing connection.

The mixture is heated to 195° C. and a xylene isomer mixture as an entrainer for the separation of water is slowly added dropwise in such a way that the internal temperature of 195° C. is maintained. After about 25 g of water has been distilled off, the reaction mixture is cooled to 140° C. and 118 g of adipic acid are added. Subsequently, the mixture is again heated to 160° C., with stirring. The stirrer is then switched off and a mixture preheated to 150° C. and consisting of 67 g of solution $C_1$ and 220 g of alkane mixture (180°-220° C.) is added. The solution mixture is then heated again to 180°-190° C. with simultaneous vigorous stirring at the top speed. A further mixture consisting of 25 g of solution $C_1$ and 25 g of alkane mixture (180°-220° C.) is then added dropwise in the course of 3 hours, about 80 g of water of reaction being distilled off simultaneously. By distilling off about 170 g of solvent mixture, a polyester microparticle dispersion having a solids content of about 75% (=dispersion $D_1$) is then obtained. It contains about 0.2% of light stabilizer (4-acryloyloxy-1,2,2,6,6-pentamethylpiperidine), relative to the solids content.

EXAMPLE 1b

A. The procedure followed is exactly as described in Example 1a, AIII, with the difference that 52.0 g of 4-acryloyloxy-1,2,2,6,6-pentamethylpiperidine are used instead of 10.4 g. This gives a solution of about 30 % solids content, containing about 11.7% of the light stabilizer, relative to the solids content (=solution $C_2$).

B. The procedure followed is exactly as described in Example 1a, B, with the difference that solution $C_2$ is used in place of solution $C_1$. This gives a polyester microparticle dispersion of about 75 % solids content, containing about 1.0% of light stabilizer, relative to the solids content (=dispersion $D_2$).

EXAMPLE 1c

A. The procedure followed is exactly as described in Example 1a, AIII, with the difference that 104.0 g of 4-acryloyloxy-1,2,2,6,6-pentamethylpiperidine are employed instead of 10.4 g. This gives a solution of about 30 5 solids content which contains about 23.4% of the light stabilizer, relative to the solids content (=solution $C_3$).

B. The procedure followed is exactly as described in Example 1a, B, with the difference that solution $C_3$ is used instead of solution $C_1$. This gives a polyester microparticle dispersion of about 75% solids content, which contains about 2.0% of the light stabilizer, relative to the solids content (=dispersion $D_3$).

EXAMPLE 2a

A. Preparation of an Amphipathic Dispersant 375 g of methyl ethyl ketone are put into a 1.5 liter sulfonation flask with reflux condenser and $N_2$ inlet, and are heated to reflux (80° C.). In the course of 2 hours, the following mixture is added dropwise:
213.5 g of solution $B_1$ (obtained according to Example 1a, AII)
184 g of methyl methacrylate
20.5 g of methacrylic acid
2.15 g of azodiisobutyronitrile and
2.15 g of n-octylmercaptan.

When the dropwise addition of the solution is complete, another 0.3 g of azodiisobutyronitrile is added and the solution is boiled under reflux for a further 2 hours. The solution is then diluted with 580 g of ®Solvesso 100 (alkane mixture: boiling range 162°–177° C.) and about 40 g of solvent mixture are distilled off. This gives a solution having a solids content of about 30% (=solution $C_4$).

B. Preparation of a Polyester Microgel Dispersion 156 g of isophthalic acid
75.5 g of trimethylolpropane
117 g of neopentyl glycol
10.4 g of 4-hydroxy-1-hydroxyethyl-2,2,6,6-tetramethylpiperidine and
1 g of tetrabutyl orthotitanate
are put into a 1.5 liter sulfonation flask fitted with a turbine stirrer, water separator and $N_2$ blanketing connection.

The mixture is heated to 195° C. and a xylene isomer mixture as an entrainer for the separation of water is slowly added dropwise in such a way that the internal temperature of 195° C. is maintained. After about 25 g of water has been distilled off, the reaction mixture is cooled to 140° C. and 118 g of adipic acid are added. Subsequently, the mixture is again heated to 160° C., with stirring. The stirrer is then switched off and a mixture preheated to 150° C. and consisting of 67 g of the solution $C_4$ obtained above and 220 g of alkane mixture (180°–220° C.) is added. The solution mixture is then heated again to 180°–190° C. with simultaneous stirring at the top speed. A further mixture consisting of 25 g of solution $C_4$ and 25 g of alkane mixture (180°–220° C.) is then added dropwise in the course of 3 hours, about 80 g of water of reaction being distilled off simultaneously. By distilling off about another 170 g of solvent mixture, a polyester microparticle dispersion of about 75% solids content is obtained, which contains 2.5% of the light stabilizer (4-hydroxy-1-hydroxyethyl-2,2,6,6-tetramethylpiperidine) (=dispersion $F_1$).

EXAMPLE 2b

The procedure followed is exactly as described in Example 2a, B, with the sole difference that, instead of the 10.4 g of 4-hydroxy-1-hydroxyethyl-2,2,6,6-tetramethylpiperidine there, only 5.2 g of this compound are employed. This gives a polyester microparticle dispersion of about 75 % solids content, which contains about 1.2% of the light stabilizer, calculated on the solids content (=dispersion $F_2$).

EXAMPLE 3a

The procedure followed is exactly as described in Example 2b, with the difference that solution $C_2$ (obtained according to Example 1b, A) is employed in place of solution $C_4$. This gives a polyester microparticle dispersion of about 75% solids content, which contains about 22% of light stabilizes (4-acryloyloxy-1,2,2,6,6-pentamethylpiperidine and 4-hydroxy-1-hydroxyethyl-2,2,6,6-tetramethylpiperidine), calculated on the solids content (=dispersion $F_3$).

EXAMPLE 3b

The procedure followed is exactly as described in Example 2b, with the difference that solution $C_3$ (obtained according to Example 1c, A) is employed in place of solution $C_4$. This gives a polyester microparticle dispersion of about 75% solids content, which contains about 3.2% of light stabilizers (4-acryloyloxy-1,2,2,6,6-pentamethylpiperidine and 4-hydroxy-1-hydroxyethyl-2,2,6,6-tetramethylpiperidine), calculated on the solids content (=dispersion $F_4$).

EXAMPLE 4a

Preparation of a Light-Stabilizer Polymethacrylate Microparticle Dispersion 142 ml of ®Solvesso 100 (alkane mixture, d=0.85, boiling point 162°–177° C.), 46 ml of hexane and 232 ml of toluene are put into a 750 ml sulfonation flask fitted with thermometer, stirrer, distillation bridge, nitrogen blanketing connection and dropping funnel. The mixture is heated to the reflux temperature (about 94° C.) under nitrogen.

A mixture consisting of
9.7 g of methyl methacrylate
0.2 g of methacrylic acid
3.6 g of solution $C_4$ (obtained according to Example 2a, A)
0.3 g of 4-acryloyloxy-1,2,2,6,6-pentamethylpiperidine and
0.8 g of azodiisobutyronitrile is added all at once and the mixture is boiled for 30 minutes under reflux (1st polymerization stage). The following mixture:
184.8 g of methyl methacrylate
1.9 g of methacrylic acid
1.9 g of glycidyl methacrylate
2.5 g of azodiisobutyronitrile
0.4 g of dimethylaminoethanol
38.8 g of solution $C_4$ (obtained according to Example 2a, A) and
4.5 g of 4-acryloyloxy-1,2,2,6,6-pentamethylpiperidine is added dropwise in the course of 3 hours to the above clear solution, still under reflux (2nd polymerization stage). With the progress of the reaction, the viscosity of the reaction mixture increases. After the dropwise addition, about 150 ml of solvent mixture are distilled off at an internal temperature of up to about 140° C. This gives a homogeneous polymethacrylate microparticle dispersion having a solids content of about 45%, which contains about 2% of light stabilizer (4-acryloyloxy-1,2,2,6,6-pentamethylpiperidine), relative to the total solids content (=dispersion $G_1$).

EXAMPLE 4b

The procedure followed is exactly as in Example 4a, with the sole difference that 0.1 g (1st polymerization stage) and 2.3 g (2nd polymerization stage) of 4-acryloyloxy-1,2,2,6,6-pentamethylpiperidine are used. This gives an about 45% polymethacrylate microparticle dispersion which contains about 1% of the light stabilizer, relative to the total solids content (=dispersion $G_2$).

EXAMPLE 4c

The procedure followed is exactly as in Example 4a, with the sole difference that 1.2 g of 4-acryloyloxy-1,2,2,6,6-pentamethylpiperidine (distributed over the two polymerization steps) are used. This gives an about 45% polymethacrylate microparticle dispersion which contains about 0.5% of light stabilizer, relative to the total solids content (=dispersion $G_3$).

EXAMPLE 4d

The procedure followed is exactly as in Example 4a, with the sole difference that only 0.24 g of 4-acryloyloxy-1,2,2,6,6-pentamethylpiperidine (distributed over the two polymerization steps) is used. This gives an about 45% polymethacrylate microparticle dispersion which contains about 0.1% of light stabilizer, relative to the total solids content (=dispersion $G_4$).

EXAMPLE 5a

Preparation of a Light-Stabilizer Polymethacrylate Microparticle Dispersion 142 ml of ®Solvesso 100 (alkane mixture, d=0.85, boiling point 162°-177° C.), 46 ml of hexane and 232 ml of toluene are put into a 750 ml sulfonation flask fitted with thermometer, stirrer, distillation bridge, nitrogen blanketing connection and dropping funnel. The mixture is heated to reflux (about 94° C.) under nitrogen. A mixture consisting of:
9.7 g of methyl methacrylate
0.2 g of methacrylic acid
3.6 g of solution $C_1$, obtained according to Example 1a, A and 0.8 g of azodiisobutyronitrile is added all at once and the mixture is boiled for 30 minutes under reflux (1st polymerization stage). The following mixture:
184.8 g of methyl methacrylate
1.9 g of methacrylic acid
1.9 g of glycidyl methacrylate
2.5 g of azodiisobutyronitrile
0.4 g of dimethylaminoethanol and
38.8 of solution $C_1$, obtained according to Example 1a, A is added dropwise in the course of 3 hours to the above clear solution under reflux (2nd polymerization stage). With the progress of the reaction, the viscosity of the reaction mixture increases. After the dropwise addition, about 150 ml of solvent mixture are distilled off at an internal temperature of up to about 140° C. This gives a homogeneous, slightly turbid polymethacrylate microparticle dispersion having a solids content of about 45%, which contains about 2.5% of light stabilizer (4-acryloyloxy-1,2,2,6,6-pentamethylpiperidine) in the amphipathic dispersant part of the microparticles (=dispersion $H_1$).

EXAMPLE 5b

The procedure followed is exactly as in Example 5a, with the sole difference that a further 0.1 g of 4-acryloyloxy-1,2,2,6,6-pentamethylpiperidine are added in the first polymerization stage and 2.3 g in the second polymerization stage. This gives an about 45% polymethacrylate microparticle dispersion which contains about 1% of light stabilizer, relative to the solids content (=dispersion $H_2$).

EXAMPLE 5c

The procedure followed is exactly as in Example 5a, with the sole difference that a further 0.3 g of 4-acryloyloxy-1,2,2,6,6-pentamethylpiperidine are added in the first polymerization stage and 4.5 g in the second polymerization stage. This gives an about 45% polymethacrylate microparticle dispersion which contains about 2% of light stabilizer, relative to the solids content (=dispersion $H_3$).

EXAMPLE 5d

The procedure followed is exactly as in Example 5a, with the sole difference that a further 0.4 g of 4-acryloyloxy-1,2,2,6,6-pentamethylpiperidine are added in the first polymerization stage and 6.8 g in the second polymerization stage. This gives an about 45% polymethacrylate microparticle dispersion which contains about 3% of light stabilizer, relative to the solids content (=dispersion $H_4$)

EXAMPLE 5e

The procedure followed is exactly as in Example 5a, with the difference that a further 0.5 g of 4-acryloyloxy-1,2,2,6,6-pentamethylpiperidine are added in the first polymerization stage and 9.1 g in the second polymerization stage. This gives an about 45% polymethacrylate microparticle dispersion which contains about 4% of light stabilizer, relative to the total solids content (=dispersion $H_5$).

In dispersion $H_2$ to $H_5$, the light stabilizer is present both in the amphipathic dispersant and in the cross-linked microparticles core.

EXAMPLE 6a

A. Preparation of an Amphipathic Dispersant 375 g of methyl ethyl ketone are put into a 1.5 liter sulfonation flask with stirrer, reflux condenser and nitrogen inlet, and heated to reflux (80° C.). The following mixture:
213.5 g of solution $B_1$, obtained according to Example 1a, AII
184 g of methyl methacrylate
20.5 g of methacrylic acid
2.15 g of azodiisobutyronitrile and
2.15 g of n-octylmercaptan
is added dropwise in the course of 2 hours.

After all the mixture has been added dropwise, a further 0.3 g of azodiisobutyronitrile is added and the mixture is boiled under reflux for a further 2 hours. The solution is then diluted with 580 g of ®Solvesso 100 (alkane mixture; boiling range 162°-177° C.) and about 40 g of solvent mixture are distilled off. This gives a solution having a solids content of about 30% (=solution $C_5$).

B. Preparation of a Light-Stabilized Polyester Microparticle Dispersion 124.6 g of isophthalic acid
60.4 g of trimethylolpropane
93.6 g of neopentyl glycol 9.8 g of 2-[2-hydroxy-3-tert-.butyl-5-(2-carboxyethyl)phenyl]-benzotriazole and
1 g of dibutyl-tin oxide
are put into a 750 ml sulfonation flask fitted with thermometer, stirrer, water separator, nitrogen blanketing connection and dropping funnel.

The mixture is then heated to 180° C. and a little xylene isomer mixture as an entrainer for separation of water is slowly added dropwise in such a way that the internal temperature of 180° C. is maintained. After about 3.5 hours, 32 ml of water have been eliminated in this way. The internal temperature is allowed to rise slowly to 195° C. The clear yellow melt is then cooled to 140° C. and 94.6 g of adipic acid are added. The mixture is reheated to 160° C. A solution consisting of 53.6 g of solution $C_5$ (obtained according to Example 6a, A) in 200 ml of ®Solvesso 100 and preheated to 150° C. is then added and the mixture is subsequently heated to about 165° C. (reflux) with rapid stirring. During the next 2 hours, a further solution of 20 g of solution $C_5$ in 20 ml of ®Solvesso 100 is added dropwise. After a total quantity of 60 ml of water has been eliminated, a further 150 ml of solvent are distilled off. After cooling, this gives then a homogeneous polyester microparticle dispersion having a solids content of about 75-80%, which contains about 3% of the benzotriazole light stabilizer, relative to the solids content (=dispersion $J_1$).

EXAMPLE 6b

The procedure followed is exactly as in Example 6a, with the difference that a total 9.75 g of 2-[2-hydroxy-3-tert.-butyl-5-(2-methoxycarbonylethyl)phenyl]-benzotriazole is employed in place of 2-[2-hydroxyl-3-tert.butyl-5-(2-carboxyethyl)-phenyl]-benzotriazole. This gives an about 75-80% polyester microparticle dispersion which contains about 3% of the benzotriazole light stabilizer, relative to the total solids content (=dispersion $J_2$).

EXAMPLE 6c

The procedure followed is exactly as indicated in Example 6a, with the difference that, in place of the 2-[2-hydroxy-3-tert.butyl-5-(2-carboxyethyl)-phenyl]-benzotriazole, 6.5 g of the following mixture consisting of components a) to c) are employed:
 a) Polyethylene glycol 300 β-[3-(2H-benzotriazol-2-yl)-4-hydroxy-5-tert.butyl-phenyl]-propionate
 b) Polyethylene glycol 300 bis-{β-[3-(2H-benzotriazol-2-yl)-4-hydroxy-5-tert.butyl-phenyl]-propionate}
 c) Polyethylene glycol 300, with a):b):c)=50:38:12.

This gives an about 75-80% polyester microparticle dispersion which contains 2% of the benzotriazole light stabilizer mixture, relative to the total solids content (=dispersion $J_3$).

EXAMPLE 6d

The procedure followed is exactly as indicated in Example 6a, with the difference that 6.5 g of 2-[2-hydroxy-3,5-di-(α,α-dimethylbenzyl)-phenyl]-benzotriazole are employed in place of the 2-[2-hydroxy-3-tert.butyl-5-(2-carboxyethyl)-phenyl]-benzotriazole. This gives an about 75-80% polyester microparticle dispersion which contains about 2% of the benzotriazole light stabilizer, relative to the total solids content (=dispersion $J_4$).

EXAMPLE 6e

The procedure followed is exactly as indicated in Example 6a, with the difference that 6.5 g of 2-[2-hydroxy-3,5-di-tert-amyl-phenyl]-benzotriazole are employed in place of the 2-[2-hydroxy3-tert.butyl-5-(2-carboxyethyl)-phenyl]-benzotriazole. This gives an about 75-80% polyester microparticle dispersion which contains about 2% of benzotriazole light stabilizer, relative to the total solids content (=dispersion $J_5$).

EXAMPLE 7a

Preparation of a Light-Stabilized Polymethacrylate Microparticle Dispersion 142 ml of ®Solvesso 100 (alkane mixture, d=0.85, boiling point 162°-177° C.), 46 ml of hexane (d=0.659) and 232 ml of toluene (D=0.871) are put into a 750 ml sulfonation flask fitted with a thermometer, stirrer, water separator, nitrogen blanketing connection and dropping funnel. The mixture is heated to reflux (about 90° C.). A solution consisting of
9.7 g of methyl methacrylate
0.2 g of methacrylic acid
0.8 g of azodiisobutyronitrile
3.6 g of solution $C_5$ (obtained according to Example 6a, A) and
4.8 g of 2-{2-hydroxy-3-tert-butyl-5-[2-(2-acryloyloxycyclohexyloxycarbonyl)-ethyl]-phenyl}-benzotriazole
is added and the mixture is boiled under reflux for 30 minutes, becoming slightly turbid. The following solution is then added dropwise in the course of 3 hours:
184.8 g of methyl methacrylate
1.9 g of methacrylic acid
1.9 g of glycidyl methacrylate
2.5 g of azodiisobutyronitrile
38.8 g of solution $C_5$ (obtained according to Example 6a, A) and
0.4 g of dimethylaminoethanol.

As the dropwise addition progresses in time, the reaction mixture becomes more viscous. After the dropwise addition, about 150 ml of solvent mixture are distilled off at about 100° C. internal temperature, the bath temperature being about 140° C. This gives a homogeneous polymethacrylate microparticle dispersion having a solids content of about 45%, which contains 2% of the benzotriazole light stabilizer, relative to the total solids content (=dispersion $K_1$).

EXAMPLE 7b

The procedure followed is exactly as indicated in Example 7a, with the difference that 4.8 g of 2-{2-hydroxy-3-tert-butyl-5-[2-(2-acryloyloxyethylaminocarbonyl)-ethyl]phenyl}-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_2$).

EXAMPLE 7c

The procedure followed is exactly as indicated in Example 7a, with the difference that 4.8 g of 2-{2-hydroxy-3-tert-butyl-5-[2-(2-acryloyloxypropylaminocarbonyl)-ethyl]phenyl}-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_3$).

EXAMPLE 7d

The procedure followed is exactly as indicated in Example 7a, with the difference that 4.8 g if 2-{2-hydroxy-3-tert-butyl-5-[2-(2-acryloyloxypropyloxycarbonyl)ethyl]phenyl}-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_4$).

EXAMPLE 7e

The procedure followed is exactly as indicated in Example 7a, with the difference that 45.8 g of 2-{2-hydroxy-3-tert-butyl-5-[2-(2-acryloyloxy-3-n-butoxy-propyloxycarbonyl)ethyl]-phenyl}-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_5$).

EXAMPLE 7f

The procedure followed is exactly as indicated in Example 7a, with the difference that 4.8 g of 2-[2-hydroxy-3-(2,3-epoxypropyl)-5-methyl-phenyl]-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_6$).

EXAMPLE 7g

The procedure followed is exactly as indicated in Example 7a, with the difference that 4.8 g of 2-{2-hydroxy-3-tert-butyl-5-[2-(2-hydroxy-3-acryloyloxypropyloxycarbonyl)ethyl]-phenyl}-benzotriazole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_7$).

EXAMPLE 7h

The procedure followed is exactly as indicated in Example 7a, with the difference that 4.8 of 2-{2-hydroxy-3-[(2-hydroxy-3-methacryloyloxy)-propyl]-5-methyl-phenyl}benzotriazole are employed in place of the 2-hydroxyphenylbenzotriazole derivative described there. This gives a homogeneous, about 45% polymethacrylate microparticle dispersion which contains 2% of the benzotriazole light stabilizer, relative to the total solids content (=dispersion $K_8$).

EXAMPLE 7i

The procedure followed is exactly as indicated in Example 7a, with the difference that 4.8 g of 2-[2-hydroxy-3,5-di-($\alpha,\alpha$-dimethylbenzyl)-phenyl[-benzotrizole are employed in place of the 2-hydroxyphenyl-benzotriazole derivative described there. This gives a homogeneous, about 45% polymethacrylate microparticle dispersion which contains 2% of the benzotriazole light stabilizer, relative to the total solids content (=dispersion $K_9$).

EXAMPLE 7k

The procedure followed is exactly as indicated in Example 7a, with the difference that 4.8 g of 2-[2-hydroxy-3,5-di-tert-amyl-phenyl]-benzotriazole are employed in place of the 2-hydroxyphenyl-benzotriazole derivative described there. This gives a homogeneous, about 45% polymethacrylate microparticle dispersion which contains 2 % of the benzotriazole light stabilizer, relative to the total solids content (=dispersion $K_{10}$).

EXAMPLE 7l

The procedure followed is exactly as indicated in Example 7a, but with the difference that, in place of the 2-hydroxyphenyl-benzotriazole derivative described there, 4.8 g of the following mixture consisting of components a) to c) are employed:

a) Polyethylene glycol 300 $\beta$-[3-(2H-benzotriazol-2-yl)-4-hydroxy-5-tert.butyl-phenyl]-propionate b) Polyethylene glycol 300 bis-{$\beta$-[3-(2H-benzotriazol-2-yl)-4-hydroxy-5-tert.butyl-phenyl]-propionate} c) Polyethylene glycol 300, with a):b):c):=50:38:12.

This gives a homogeneous about 455 polymethacrylate microparticle dispersion which contains 2% of the light stabilizer mixture described above, relative to the total solids content (=dispersion $K_{11}$).

EXAMPLE 8a

A. Preparation of an Amphipathic Dispersant 74 ml of methyl ethyl ketone are put into a 350 ml sulfonation flask fitted with thermometer, stirrer, reflux condenser and nitrogen blanketing connection, and are heated to the reflux temperature (about 80° C.). In the course of 2 hours, a solution consisting of
29.3 g of methyl methacrylate
3.25 g of methyacrylic acid
34.2 g of solution of $B_1$, obtained according to Example 1a, AII 0.4 g of azodiisobutyronitrile and
27.4 g of 2-{2-hydroxy-3-tert-butyl-5-[2-(2-acryloyloxycyclohexyloxycarbonyl)-ethyl]phenyl}-benzotriazole is added dropwise. A further 0.1 g of azodiisobutyronitrile is then added and the mixture is allowed to boil under reflux for a further 2 hours. 100 ml of ®Solvesso 100 (alkane mixture, boiling point 162°-177° C.) are then added and the viscous solution is cooled (=solution $C_6$).

B. Preparation of a Light-Stabilized Polymethacrylate Microparticle Dispersion 142 ml of ®Solvesso 100 (alkane mixture, boiling point 162°-177° C.), 46 ml of hexane and 232 ml of toluene are put into a 750 ml sulfonation flask fitted with thermometer, stirrer, water separator, nitrogen blanketing connection and dropping funnel. This solvent mixture is heated to the reflux temperature (about 90° C.). Then a solution consisting of
9.7 g of methyl methacrylate
0.2 g of methacrylic acid
0.8 g of azodiisobutyronitrile and
3.6 g of solution $C_6$ (obtained according to Example 8a, A)
is added. The mixture is boiled for 30 minutes under reflux, a whitish turbidity appearing. In the course of 3 hours, the following further solution is added dropwise:
184.4 g of methyl methacrylate
1.9 g of methacrylic acid
1.9 g of glycidyl methacrylate
2.5 g of azodiisobutyronitrile
38.8 g of solution $C_6$ and
0.4 g of dimethylaminoethanol.

As the dropwise addition progresses in time, the reaction mixture becomes more viscous. After the dropwise addition, 150 ml of solvent mixture are distilled off at about 100° C. internal temperature, the bath temperature being about 140° C. This gives a homogeneous, about 45% polymethacrylate microparticle dispersion which contains 2% of benzotriazole light stabilizer, relative to the total solids content (=dispersion $L_1$).

EXAMPLE 8b

A. The procedure followed is exactly as indicated in Example 8a, A, with the difference that 27.4 g of 2-{2-hydroxy-3-tert-butyl-5-[2-(2-acryloyloxyethylaminocarbonyl)-ethyl]-phenyl}-benzotriazole are employed in place of the benzotriazole derivative used there, solution $C_7$ being obtained.

B. The procedure followed is exactly as indicated in Example 8, B, with the difference that solution $C_7$ is used in place of solution $C_6$. This gives an about 45% polymethacrylate microparticle dispersion which contains the benzotriazole light stabilizer described above in a quantity of 2%, relative to the total solids content (=dispersion $L_2$).

EXAMPLE 8c

A. The procedure followed is exactly as indicated in Example 8a, A, with the difference that 27.4 g of 2-{2-hydroxy-3-tert-butyl-5-[2-(2-hydroxy-3-acryloyloxypropyloxycarbonyl0-ethyl]-phenyl}-benzotriazole are employed in place of the benzotriazole derivative used there, solution $C_8$ being obtained.

B. The procedure followed is exactly as indicated in Example 8a, B, with the difference that solution $C_8$ is used in place of solution $C_6$. This gives an about 45% polymethacrylate microparticle dispersion which contains the benzotriazole light stabilizer described above in a quantity of 2%, relative to the total solids content (=dispersion $L_3$).

EXAMPLE 9

Preparation of a Light-Stabilized Polyester Microparticle Dispersion 124.6 g of isophthalic acid
60.4 g of trimethylolpropane
93.6 g of neopentyl glycol
1 g (=0.5 mol ) of dibutyl-tin oxide and
9.75 g of 2-[2-hydroxy-3-tert-butyl-5-(2-carboxyethyl)-phenyl]-benzotriazole
are put into a 750 ml sulfonation flask with thermometer, dropping funnel, stirrer and water separator, and the mixture is heated with a little xylene (isomer mixture) to 180° C. In the course of 5¼ hours, about 36 ml of water are then eliminated in the water separator, the internal temperature rising to about 195° C. The clear melt is then cooled to 140° C. 94.6 g of adipic acid are then added. When everything has melted, the mixture is heated to 160° C. internal temperature. With the stirrer switched off, 53.6 g of solution $C_1$ (obtained according to Example 1a, A) in 200 ml of ®Solvesso 100 are then added, the solution having been heated to 150° C. beforehand. With rapid stirring, the mixture is heated again to 160°-165° C. (reflux). In the course of 2 hours, a further 20 g of solution $C_1$ dissolved in 20 ml of ®Solvesso 100 are then slowly added dropwise. As soon as a total quantity of 60 ml of water has separated out, a further 150 ml of solvent mixture are distilled off and the reaction is stopped.

This gives a homogeneous about 75-80% polyester microparticle dispersion which contains about 0.2 % of the amine light stabilizer (4-acryloyloxy-1,2,2,6,6-pentamethylpiperidine) and 3% of the benzotriazole light stabilizer, each relative to the total solids content (=dispersion $M_1$).

EXAMPLE 10a

Preparation of a Light-Stabilized Polymethacrylate microparticle Dispersion 142 ml ®Solvesso 100 (alkane mixture, d=0.85, boiling point 162°-177° C.), 46 ml of hexane and 232ml of toluene are put into a 750 ml sulfonation flask fitted with stirrer, thermometer, water separator, nitrogen blanketing connection and dropping funnel. The mixture is heated to the reflux temperature (about 90°) C.). A solution consisting of
9.7 g of methyl methacrylate
0.2 g of methacrylic acid
0.8 g of azodiisobutyronitrile
5.0 g of solution $C_1$ (obtained according to Example 1a, A) and
4.8 g of 2-{2-hydroxy-3-tert-butyl-5-[2-(2-acryloyloxycyclohexyloxycarbonyl)ethyl]-phenyl}-benzotriazole
is added and the whole is heated under reflux for 30 minutes. A further solution of the following constituents:
184.4 g of methyl methacrylate 1.9 g of methacrylic acid
1.9 g of glycidyl methacrylate
2.5 g of azodiisobutyronitrile
50.0 g of solution $C_1$ (obtained according to Example 1a, A) and
0.4 g of dimethylaminoethanol is then added dropwise in the course of 3 hours from a dropping funnel. With the dropwise addition proceding in time, the reaction mixture becomes more viscous. After the dropwise addition, 150 ml of solvent mixture are distilled off at about 100° C. internal temperature, the bath temperature being about 140° C. This gives an about 45% homogeneous polymethacrylate microparticle dispersion which contains about 0.2% of amine light stabilizer and about 2% of benzotriazole light stabilizer, relative to the total solids content (=dispersion $N_1$).

EXAMPLES 10b-10h

The procedure followed is as indicated in Example 10a, but with the difference that, in place of the 2-hydroxyphenyl-benzotriazole derivatives used in Examples 7b-7h are used in each case, the 45% polymethacrylate microparticle dispersions $N_2$ to $N_8$ being obtained.

EXAMPLE 11

Preparation of Light-Stabilized Polymethacrylate Microparticle Dispersions 142 ml of ®Solvesso 100, 46 ml of hexane and 232 ml of toluene are in each case put into a 750 ml sulfonation flask fitted with stirrer, thermometer, water separator, nitrogen blanketing connection and dropping funnel. The mixture is heated to reflux (about 90° C.). In each case, a solution of the following components is added:
9.7 g of methyl methacrylate
0.2 g methacrylic acid
0.8 g of azodiisobutyronitrile and
3.6 g of solution $C_6$, $C_7$ or $C_8$ (obtained according to Examples 8a, A, 8b, A or 8c, A respectively).

The mixture is boiled for 30 minutes under reflux, becoming slightly turbid. A solution of the following constituents is then added dropwise in the course of 3 hours from the dropping funnel:
184.8 of methyl methacrylate
1.9 g of methacrylic acid
1.9 g of glycidyl methacrylate
2.5 g of azodiisobutyronitrile
38.8 g of solution $C_6$, $C_7$ or $C_8$ (obtained according to Examples 8a, A, 8b, A or 8c, A respectively)
0.4 g of dimethylaminoethanol and
2.2 g of 4-acryloyloxy-1,2,2,6,6-pentamethylpiperidine.

The reaction mixture becomes more viscous with time. After the dropwise addition, about 150 ml of solvent mixture are distilled off at 100° C. internal temperature, the bath temperature being about 140° C. This gives an about 45% homogeneous polymethacrylate microparticle dispersion which contains about 1% of amine light stabilizer and about 2% of the particular benzotriazole light stabilizer, each relative to the total solids content of the dispersion (=dispersions $P_1$,$P_2$ and $P_3$).

EXAMPLE 12a

Preparation of a Light-Stabilized Polyester Microparticle Dispersion 128.5 g of an alkane mixture (®Solvesso 100, boiling range 162°-177° C.)
90.3 g of solution $C_4$ (obtained according to Example 2a, A)
192.0 g of phthalic anhydride and
0.3 g of tetrabutyl orthotitanate
are put into a 750 ml sulfonation flask fitted with a turbine stirrer, water separator and $N_2$ blanketing connection. The mixture is heated under nitrogen and with vigorous stirring to about 150° C., the phthalic anhydride melting and being emulsified in the solvent. One half of the following mixture:
35.0 g of trimethylolpropane
79.8 g of 1,4-butanediol
8.8 g of 1,6-hexanediol and
4.5 g of 4-hydroxy-N-hydroxyethyl-2,2,6,6-tetramethylpiperidine
is then added and the whole is heated to reflux. The second half of the mixture is added dropwise in the course of 2 hours reaction mixture. The latter is then boiled under reflux for a further 16 hours with separation of water. This gives a white, opaque, stable dispersion having an acid number of 20 mg of KOH/g. After 40 g of solvent have been distilled off, this gives a polyester microparticle dispersion of about 70% solids content, which contains about 1.0% of the amine light stabilizer, relative to the solids content (=dispersion $Q_1$).

EXAMPLE 12b

The procedure followed is exactly as described in Example 12a, with the sole difference that, in place of the said 3.5 g of 4-hydroxy-N-hydroxyethyl-2,2,6,6-tetramethylpiperidine, 7.0 g of this compound are employed. This gives a polyester microparticle dispersion of about 70% solids content, which contains about 2.0% of the light stabilizer, relative to the solids content (=dispersion $Q_2$).

EXAMPLE 13

13.1 Preparation of a Light-Stabilized Polymethacrylate Microparticle Dispersion 260 ml of heptane (isomer mixture) are put into a 750 ml sulfonation flask fitted with stirrer, thermometer, reflux condenser, nitrogen blanketing connection and dropping funnel and are heated to the reflux temperature (95°-99° C.). The following solution:
27.1 g of methyl methacrylate
2.1 g of azodiisobutyronitrile and
9.9 g of solution $C_4$ (obtained according to Example 2a, A)
is added to the initial mixture. After the dropwise addition, this solution is then allowed to react for 30 minutes under reflux. The following solution is then added dropwise in the course of 3 hours from the dropping funnel to the reaction mixture:
124.6 g of methyl methacrylate
3.9 g of allyl methacrylate
1.7 g of azodiisobutyronitrile
26.6 g of solution $C_4$ (obtained according to Example 2a, A) and
4.5 g of 4-acryloyloxy-1,2,2,6,6-pentamethylpiperidine.

In the course of time, a thin white suspension forms. This is stirred for about 1 hour under reflux. 95 ml of heptane are then added. The following further solution is then added dropwise from the dropping funnel in the course of 1 hour:
19.3 g of methyl methacrylate
16.1 g of butyl acrylate
10.2 hydroxyethyl acrylate
6.2 g of acrylic acid
0.35 g of azodiisobutyronitrile and
10.8 g of solution $C_4$ (obtained according to Example 2a, A).

After the dropwise addition, the white suspension is stirred for a final 1 hour. This gives an about 45% polymethacrylate microparticle dispersion which contains about 25 of light stabilizer, relative to the total solids content (=dispersion $R_1$).

13.2 Preparation of a Microparticle Dispersion in Water 362 ml of water, 57.2 ml of butoxyethanol and 6 ml of diethylaminoethanol are put into a 1.5 liter sulfonation flask fitted with stirrer, thermometer, dropping funnel and a 15 cm Vigreux column with distillation bridge, and the mixture is heated to 45°-50° C. with rapid stirring. In the course of 45-60 minutes, 465.2 g of the microparticle dispersion $R_1$ are then allowed to run in from the dropping funnel under a slight vacuum in such a way that all the heptane distills off immediately. Some water also passes azeotropically into the distillate. This gives a thick white aqueous dispersion of the light-stabilized microparticles, having a solids content of about 30-32% (=dispersion $WR_1$).

EXAMPLE 14

14.1 Preparation of a Light-Stabilized Polymethacrylate Microparticle Dispersion The procedure followed is exactly as described in Example 13.1, with the difference that the light-stabilized solution $C_6$ (obtained according to Example 8a, A) is used in place of solution $C_4$ and no light stabilizer (4-acryloyloxy-1,2,2,6,6-pentamethylpiperidine) is added. This gives an about 45% polymethacrylate microparticle dispersion which contains about 2% of benzotriazole light stabilizer, relative to the total solids content (=dispersion $R_2$).

14.2 Preparation of a microparticle dispersion in Water

The procedure is exactly as described in detail in Example 13.2, with the difference that dispersion $R_2$ is employed in place of $R_1$. This likewise gives an about 30-32% aqueous microparticle dispersion (=dispersion $WR_2$).

EXAMPLE 15

15.1 Preparation of a Light-Stabilized Amphipathic Dispersant

The procedure is analogous to Example 1a, AIII, with the sole difference that 59 g of 4-acryloyloxy-1,2,2,6,6-pentamethylpiperidine are used in place of the 10.4 g indicated there. This gives an about 30% solution containing about 13.1% of the light stabilizer, calculated on the solids content (=solution $C_{10}$).

15.2 Preparation of a Light-Stabilized Polymethacrylate Microparticle Dispersion The procedure followed is exactly as described in Example 13.1, with the difference that solution $C_{10}$ obtained as above is used in place of solution $C_4$ and no light stabilizer (4-acryloyloxy-1,2,2,6,6-pentamethylpiperidine) is added. This gives an about 45% polymethacrylate microparticle dispersion which contains about 1% of light stabilizer, relative to the total solids content (=dispersion $R_3$).

15.3 Preparation of a Microparticle Dispersion in Water

The procedure is exactly as described in detail in Example 13.2, dispersion $R_3$ being employed in place of dispersion $R_1$. This likewise gives an about 30-32% aqueous light-stabilized microparticle dispersion (=dispersion $WR_3$).

EXAMPLE 16

16.1 Preparation of a Light-Stabilized Polymethacrylate Microparticle Dispersion The procedure followed is exactly as described in Example 13.1, with the difference that solution $C_{10}$, obtained according to Example 15.1, is used in place of solution $C_4$. This gives an about 455 polymethacrylate microparticle dispersion which contains about 3% of light stabilizer, relative to the total solids content (=dispersion $R_4$).

16.2 Preparation of a Microparticle Dispersion in Water

The procedure followed is analogous to that described in detail in Example 13.2, dispersion $R_4$ being employed in place of dispersion $R_1$. This gives an about 30-32% aqueous light-stabilized microparticle dispersion (=dispersion $WR_4$).

EXAMPLE 17

17.1 Preparation of a Light-Stabilized Polymethacrylate Microparticle Dispersion The procedure followed is exactly as described in Example 13.1, with the difference that solution $C_6$ (obtained according to Example 8a, A) is used in place of solution $C_4$. This gives an about 45% polymethacrylate microparticle dispersion which contains about 2% each of benzotriazole and amine light stabilizers, relative to the total solids content (=dispersion $R_5$).

17.2 Preparation of a Microparticle Dispersion in Water

The procedure is as described in detail in Example 13.2, dispersion $R_5$ being employed in place of dispersion $R_1$. This likewise gives an about 30-32% aqueous light-stabilized microparticle dispersion (=dispersion $WR_5$).

EXAMPLE 18

18.1 Preparation of a Light-Stabilized Polymethacrylate Microparticle Dispersion The procedure is exactly as described in Example 13.1, with the difference that, in place of solution $C_4$, solution $C_{10}$ described above (obtained according to Example 15.1) is used and, in place of 4.5 g of 4-acryloyloxy-1,2,2,6,6-pentamethylpiperidine, 4.5 g of 2-{2-hydroxy-3-tert-butyl-5-[2-(2-acryloyloxycyclohexyloxycarbonyl)-ethyl]-phenyl}-benzotriazole are used. This gives an about 45% polymethacrylate microparticle dispersion which contains about 1% of amine light stabilizer (4-acryloyloxy-1,2,2,6,6-pentamethylpiperidine) and about 2% of the benzotriazole light stabilizer employed, each relative to the total solids content (=dispersion $R_6$).

18.2 Preparation of a Microparticle Dispersion in Water

The procedure followed is analogous to that described in detail in Example 13.2, dispersion $R_6$ being employed in place of dispersion $R_1$. This gives an about 30-32% aqueous dispersion of light-stabilized microparticles (=dispersion $WR_6$).

EXAMPLE 19

Preparation of a Reactive Diluent 141 g of oleic acid (technical)
67 g of trimethylolpropane
91 g of adipic acid and
59 of 1,6-hexanediol
are put into a 750 ml sulfonation flask fitted with stirrer, $N_2$ inlet and water separator.

This mixture is heated to 190° C. and toluene as a water entrainer is slowly added dropwise in the course of 8 hours in such a way that the temperature of 190° C. is maintained. About 43 g of water of reaction are distilled off. The ester obtained has a solids content of about 93% (=solution $E_1$).

EXAMPLE 20

Preparation of a Reactive Diluent (for the Preparation of Polyurethanes)

400.6 g of lauric acid and 268.4 g of trimethylolpropane are put into a 1.5 liter sulfonation flask fitted with stirrer, $N_2$ inlet and water separator. This mixture is heated to 190° C. and toluene as a water entrainer is slowly added dropwise in the course of 8 hours in such a way that the temperature of 190° C. is maintained. 100.1 g of succinic anhydride are then added, and heating is continued for a further 8 hours under the same conditions. The ester obtained has a solids content of about 95% and an acid number of 5 mg of KOH/g (=solution $E_2$).

EXAMPLE 21

Preparation and Application of a Curable Coating Composition

The polyester microparticle dispersion $D_2$, as obtained according to Example 1b, B, is mixed with a melamine/formaldehyde resin (®Cymel 301 from Cyanamid Corp.) in such a ratio that the solids ratio is 10:1. 0.2% of p-toluenesulfonic acid, relative to the total solids content, is added. The resulting mixture has a total solids content of about 75%.

The coating mixture thus obtained is diluted with butylglycol acetate up to sprayability (additionally, a flow aid can also be added) and sprayed onto a prepared aluminium sheet (coil coat, filler, silver-metallic basecoat) and baked at 150° C. for 30 minutes. This gives a dry layer thickness of 40 μm of clear coat.

For comparison, a coating mixture is used which contains unstabilized microparticles (prepared without an addition of light stabilizer), but in other respects is prepared and applied in the same way as above.

The specimens are tested both by accelerated weathering (®Uvcon weathering apparatus from Atlas Corp., 4 hours UV at 60° C., 4 hours condensation at 50° C.) and outside weathering (Florida, 5° south, black box, unheated).

The stabilized specimen has better gloss retention and longer freedom from cracks than the unstabilized comparison specimen.

EXAMPLES 22-26

The procedure followed is exactly as indicated in Example 21, with the difference that the dispersions
$D_3$ (obtained according to Example 1c, B)
$F_2$ (obtained according to Example 2b)
$F_3$ (obtained according to Example 3a)
$F_4$ (obtained according to Example 3b) and
$J_1$ (obtained according to Example 6a)
are employed in place of dispersion $D_1$.

The results of the accelerated weathering tests are compiled in Table 1 which follows. In each case, the 20° gloss (in %) is measured, and the time is determined after which cracks form.

TABLE 1

| Example | Microgel dispersion | 20° gloss (in %) after hours | | | | | | Cracking after... hours |
|---|---|---|---|---|---|---|---|---|
| | | 0 | 400 | 800 | 1000 | 1200 | 1400 | |
| — | — | 81 | 75 | 55 | 38 | | | 1000 |
| 21 | $D_2$ | 88 | 82 | 66 | 63 | 61 | 53 | 1400 |
| 22 | $D_3$ | 86 | 84 | 79 | 77 | 75 | 57 | 1400 |
| 23 | $F_2$ | 77 | 60 | 64 | 59 | 47 | 25 | 1400 |
| 24 | $F_3$ | 89 | 80 | 69 | 68 | 64 | 56 | 1400 |
| 25 | $F_4$ | 90 | 85 | 81 | 80 | 79 | 51 | 1400 |
| 26 | $J_1$ | 76 | 88 | 63 | 54 | 38 | 27 | 1400 |

EXAMPLE 27

Preparation and Application of a Curable Coating Composition

The polyester microparticle dispersion $D_2$, as obtained according to Example 1b, B, is mixed with a melamine/formaldehyde resin (®Cymel 301 from Cyanamid Corp.) and with the reactive diluent obtained according to Example 19 (solution $E_1$) in a ratio such that the solids ratio of the three components is 9:1.3:1. 0.4% of p-toluenesulfonic acid, relative to the said solids content, is added to the mixture.

The application, curing and testing of the coating mixture thus obtained are carried out as described in Example 21.

EXAMPLES 28-31

The procedure followed is exactly as in Example 27, with the difference that the dispersions
$D_3$ (obtained according to Example 1c, B)
$F_2$ (obtained according to Example 2b)
$F_3$ (obtained according to Example 3a)
$F_4$ (obtained according to Example 3b) are employed in place of dispersion $D_2$.

The results of the accelerated weathering tests are compiled in Table 2 which follows. In each case, the 20° gloss (in %) is measured, and the time is determined after which cracks form.

TABLE 2

| Example | Microgel dispersion | 20° gloss (in %) after hours | | | | | | Cracking after... hours |
|---|---|---|---|---|---|---|---|---|
| | | 0 | 400 | 800 | 1000 | 1200 | 1400 | |
| — | — | 81 | 82 | 72 | 52 | | | 1000 |
| 27 | $D_2$ | 88 | 76 | 59 | 51 | 45 | 33 | 1400 |
| 28 | $D_3$ | 86 | 84 | 82 | 80 | 80 | 67 | 1400 |
| 29 | $F_2$ | 85 | 74 | 67 | 63 | 56 | 27 | 1400 |
| 30 | $F_3$ | 84 | 81 | 76 | 75 | 72 | 61 | 1400 |
| 31 | $F_4$ | 88 | 87 | 84 | 83 | 83 | 78 | 1600 |

EXAMPLE 32

The procedure followed is analogous to Example 21 or 27, with the difference that dispersion $D_1$ (obtained according to Example 1a, B) or $F_1$ (obtained according to Example 2a, B) is used in place of dispersion $D_2$. Paint films are again obtained which show better gloss retention and longer freedom from cracks than in the case of using unstabilized microparticles.

EXAMPLE 33

The procedure followed is analogous to Example 27, with the difference that in each case, in place of dispersion $D_2$, the dispersions $G_1$ to $G_4$ (obtained according to Examples 4a to 4d), $H_1$ to $H_5$ (obtained according to Examples 5a to 5e), $J_1$ to $J_5$ (obtained according to Examples 6a to 6e), $K_1$ to $K_{11}$ (obtained according to Examples 8a to 8c) are employed. Paint films are again obtained which show better gloss retention and longer freedom from cracks than in the case of using unstabilized microparticles.

EXAMPLE 34

Preparation and Application of a Curable PUR Coating Composition

The microparticle dispersion $Q_1$ as obtained according to Example 12a is mixed with an isocyanate resin (®Desmodur N 75 from Bayer AG) in a ratio such that the solids ratio is 1:1. 0.5%, relative to the total solids content, of zinc octoate (as an 8% solution) is added to the mixture.

The coating composition thus obtained is diluted with butylglycol acetate up to sprayability (additionally, a flow aid can be added) and sprayed onto a prepared aluminium sheet (coil coat, filler, silver-metallic basecoat) and baked at 150° C. for 30 minutes. This gives a dry film thickness of about 50 μm of clear coat.

The specimens are tested by accelerated weathering (®Uvcon weathering apparatus from Atlas Corp., 4 hours UV at 60° C., 4 hours condensation at 50° C.).

EXAMPLE 35

Preparation and Application of a Curable PUR Coating Composition

The microparticle dispersion $Q_1$, as obtained according to Example 12a, is mixed with an isocyanate resin (®Desmodur N 75 from Bayer AG) and with the reactive diluent obtained according to Example 20 (solution $E_2$) in a ratio such that the solids ratio of the three components is 4:5:1. 0.5%, relative to the total solids content, of Zn octoate (as an 8% solution) is added to the mixture.

The application, curing and testing of the coating mixture thus obtained are carried out as described in Example 34.

EXAMPLE 36

The procedure followed is analogous to Example 34, with the difference that dispersion $Q_2$ (obtained according to Example 12b) is employed in place of dispersion $Q_1$.

EXAMPLE 37

The procedure followed is analogous to Example 35, with the difference that dispersion $Q_2$ (obtained according to Example 12b) is employed in place of dispersion $Q_1$.

EXAMPLE 38

Preparation and Application of a Curable Coating Composition from an Aqueous System The aqueous microparticle dispersion $WR_1$ (obtained according to Example 13.2) is mixed with a water-soluble melamine resin (®Luwipal 0.63 from BASF) such that the solids ratio is 7:3. The mixture obtained is sprayed onto a prepared aluminium sheet (coil coat, filler, silver metallic base coat) and baked. This gives a dry film thickness of about 50 μm of clear coat.

The specimen is tested by accelerated weathering (®Uvcon weathering apparatus from Atlas Corp., 4 hours UV at 60°, 4 hours condensation at 50° C.) and compared with a specimen which was treated in the same way and for the preparation of which unstabilized microparticles were used. The stabilized specimen has better gloss retention and longer freedom from cracks than the unstabilized comparison specimen.

If the dispersion $WR_1$ employed in the above instructions is replaced by the dispersions $WR_2$ to $WR_6$ (obtained according to Examples 14 to 18), similar results are obtained.

What is claimed is:

1. Light-stabilized polymer microparticles having a crosslinked core, essentially linear to branched polymer chains polymerized thereon and a particle size distribution of 0.10–20 μm, resulting from the addition polymerization of one or several different ethylenically monounsaturated or polyunsaturated monomeric compounds, which microparticles contain 0.1 to 30% by weight, relative to the monomers, of at least one light stabilizer and wherein the addition polymerization is carried out in the presence of 0.1 to 30% by weight, relative to the monomers, of at least one light stabilizer and the latter being present in the polymer microparticles; said light stabilizer being a 2,2,6,6-tetraalkylpiperidine derivative which contains in its molecule at least one group of the formula I

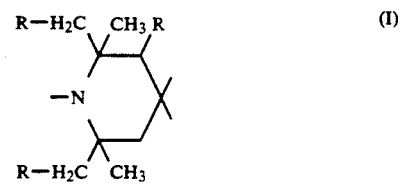

in which R is hydrogen or methyl, a UV absorber or mixtures thereof; said light stabilizer containing at least one ethylenic double bond.

2. Microparticles according to claim 1 wherein the light stabilizer is a 2,2,6,6-tetraalkylpiperidine derivative which contains in its molecule at least one group of the formula I

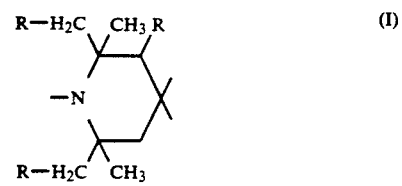

in which r is hydrogen or methyl.

3. Microparticles according to claim 1 wherein the light stabilizer is a UV absorber.

4. Microparticles according to claim 1 wherein a UV absorber and a 2,2,6,6-tetraalkylpiperidine derivative are the light stabilizer.

5. Microparticles according to claim 1 wherein the UV absorber belongs to the class of 2-2-hydroxyphenyl)-benzotriazoles.

* * * * *